(12) United States Patent
Hagiwara et al.

(10) Patent No.: US 6,894,758 B1
(45) Date of Patent: May 17, 2005

(54) LIQUID CRYSTAL DEVICE AND MANUFACTURING METHOD THEREOF

(75) Inventors: Takeshi Hagiwara, Matsumoto (JP);
Keiichi Suehiro, Matsumoto (JP);
Tetsuo Shimizu, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/700,129

(22) PCT Filed: Mar. 8, 2000

(86) PCT No.: PCT/JP00/01412

§ 371 (c)(1),
(2), (4) Date: Feb. 23, 2001

(87) PCT Pub. No.: WO00/54099

PCT Pub. Date: Sep. 14, 2000

(30) Foreign Application Priority Data

| Mar. 8, 1999 | (JP) | 11-060462 |
| Mar. 19, 1999 | (JP) | 11-076103 |
| Mar. 24, 1999 | (JP) | 11-080328 |
| Mar. 24, 1999 | (JP) | 11-080329 |
| Sep. 8, 1999 | (JP) | 11-254819 |

(51) Int. Cl.[7] .......................... G02F 1/1345
(52) U.S. Cl. ...................... 349/152; 349/151
(58) Field of Search .................. 349/149–152, 349/153, 155

(56) References Cited

U.S. PATENT DOCUMENTS

| 4,483,591 A | 11/1984 | Baeger | 349/138 |
| 5,467,210 A | 11/1995 | Kishigami | 349/149 |
| 5,530,568 A | 6/1996 | Yamamoto | 349/143 |
| 5,541,748 A | 7/1996 | Ono | 349/104 R |
| 5,670,994 A | 9/1997 | Kawaguchi et al. | 345/206 |
| 5,838,412 A | 11/1998 | Ueda | 349/150 |

FOREIGN PATENT DOCUMENTS

| JP | 58-70212 | 4/1983 |
| JP | 60-220317 | 5/1985 |
| JP | 63-092926 | 4/1988 |
| JP | 02-287433 | 11/1990 |
| JP | 03-26121 | 2/1991 |
| JP | 04-109731 | 6/1991 |
| JP | 03-209426 | 9/1991 |
| JP | 03-266817 | 11/1991 |
| JP | 05-142556 | 6/1993 |
| JP | 06-015038 U | 2/1994 |
| JP | 06-202139 | 7/1994 |
| JP | 6-235929 | 8/1994 |
| JP | 06-289378 | 10/1994 |
| JP | 09-033941 | 2/1997 |
| JP | 10-207399 | 8/1998 |
| JP | 11-14556 | 1/1999 |
| JP | 11-084387 | 3/1999 |

*Primary Examiner*—Dung T. Nguyen
(74) *Attorney, Agent, or Firm*—Harness, Dickey & Pierce, P.L.C.

(57) ABSTRACT

For providing a liquid crystal device comprising a structure capable of uniformly supporting a terrace area in the liquid crystal device, a pair of insulation films 112 are formed on the terrace area 11a so as to cover a part of wiring lines 131a and 131b simultaneously with forming the insulation films 112 on electrodes 111 using the same material as the insulation film on the electrodes, and an orientation film 113 is additionally formed on the insulation films 112. The orientation film 113 is also formed on the insulation films 112 formed on the terrace area 11a, and the orientation film 113 is formed so as to expand out of the outer edge of the insulation films 112.

22 Claims, 27 Drawing Sheets

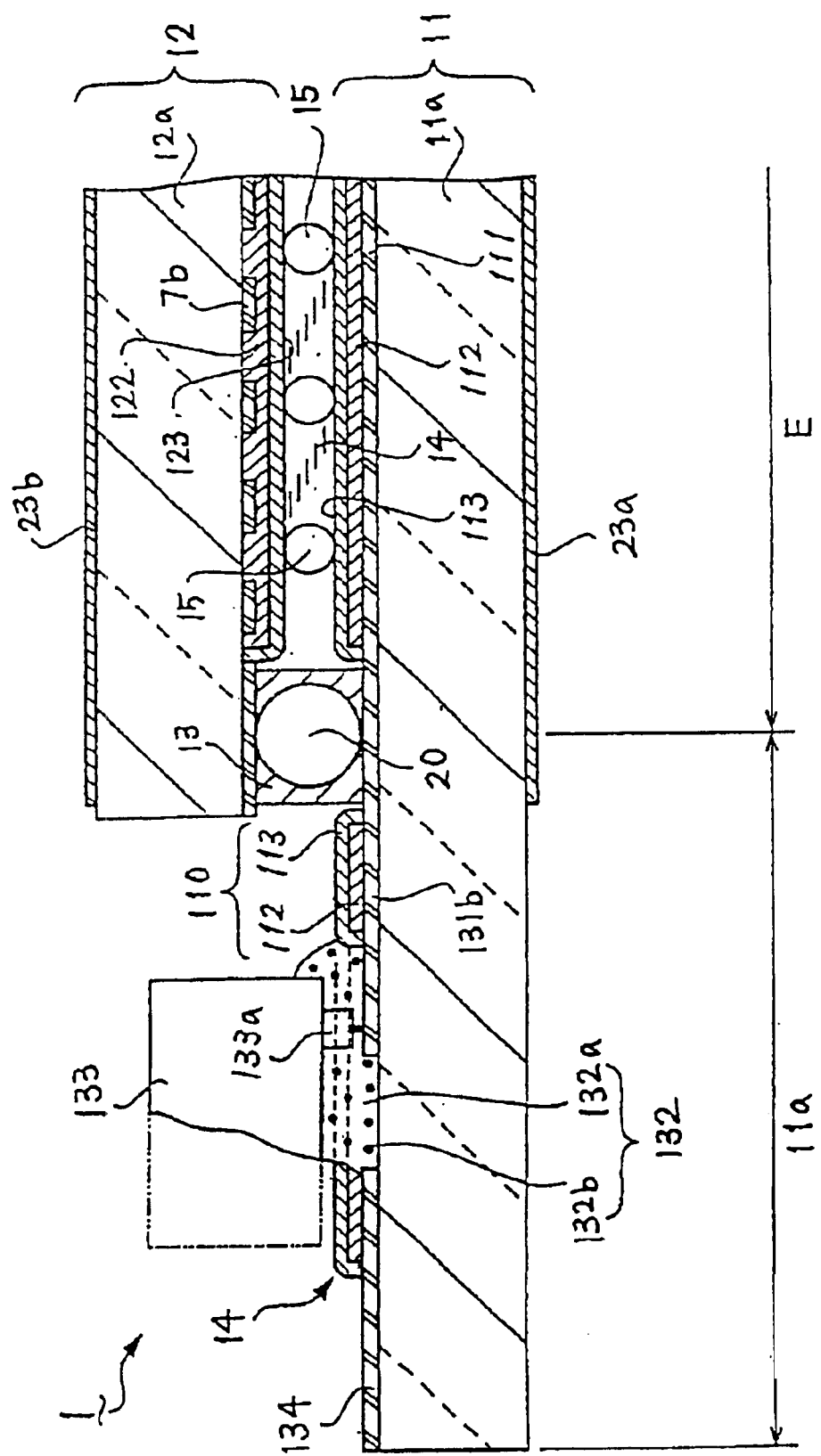

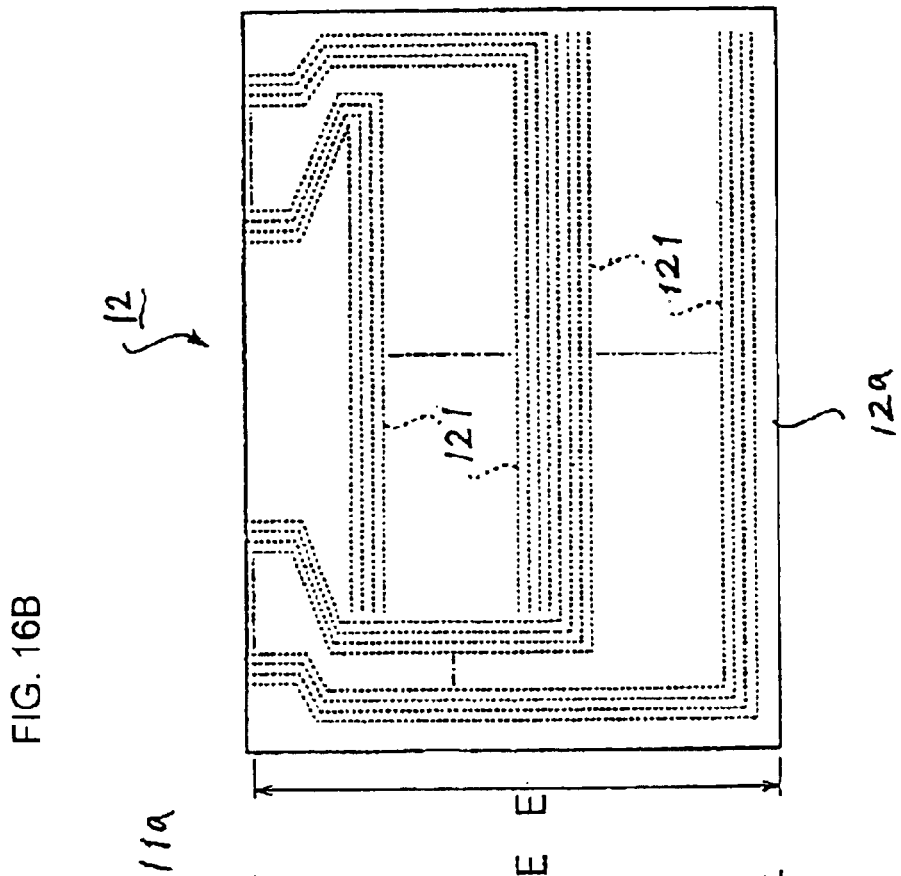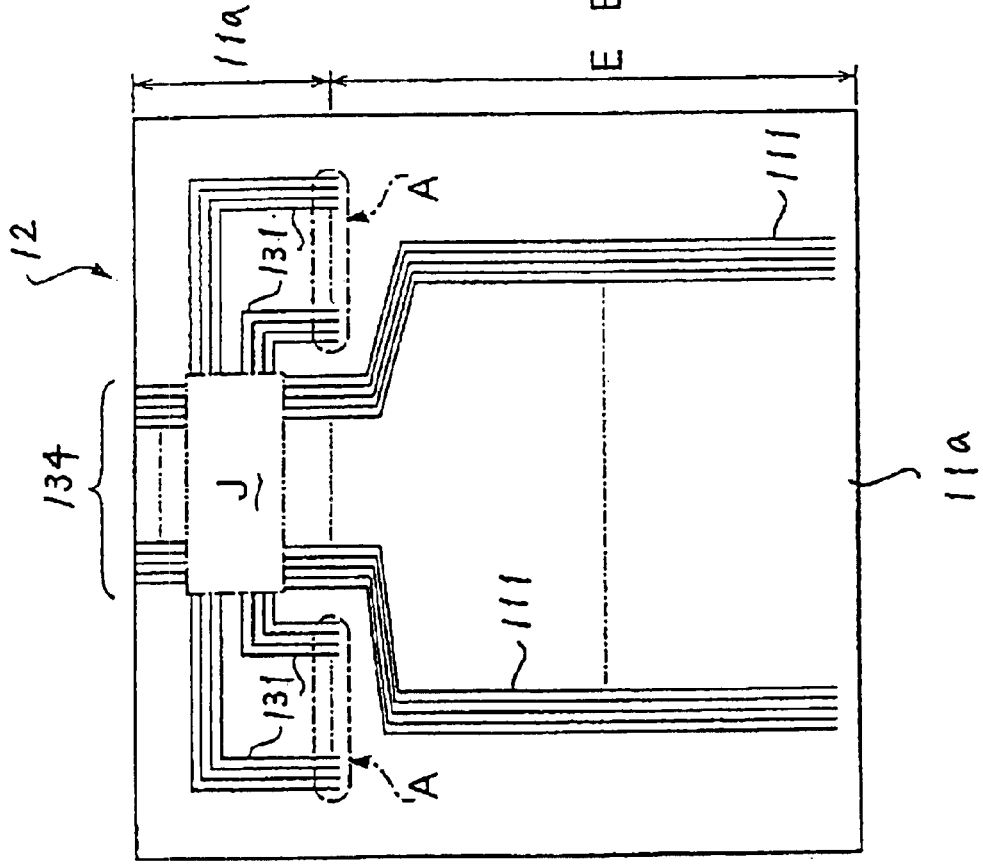
FIG. 16B
FIG. 16A

LIQUID CRYSTAL DEVICE AND MANUFACTURING METHOD THEREOF

TECHNICAL FIELD

The present invention relates to a liquid crystal device and a manufacturing method thereof. The present invention particularly relates to a structure of a terrace area comprising wiring lines pulled out of a liquid crystal seal area.

BACKGROUND ART

Conventional liquid crystal devices are constructed by bonding a pair of transparent substrates to one another via a seal member, and sealing a liquid crystal between the substrates inside of the seal member, or within a liquid crystal seal area.

One example of the structure of the liquid crystal devices is shown in FIGS. 31(a) and 31(b). FIG. 31(a) is a planar perspective view illustrating the planar structure of the liquid crystal device 1, and FIG. 31(b) is an enlarged cross section illustrating the structure in the vicinity of a terrace area 11a in the liquid crystal device 1. The liquid crystal device 1 comprises two sheet of transparent substrates 11 and 12 bonded to one another via a seal member 13. The transparent substrate 11 is formed to be slightly wider than the transparent substrate 12, and a terrace area 11a that protrudes at the side of the end portion of the transparent substrate 12 is formed on the transparent substrate 11. The inside of the seal member 13 serves as a rectangular liquid crystal seal area A.

Transparent electrodes 111 are formed within the liquid crystal seal area A on the transparent substrate 11, and wiring lines 131a are pulled out on the surface of the terrace area 11a after passing under the seal member 13. An insulation film 112 is formed on the transparent electrodes 111 by being restricted only on the liquid crystal seal area A, and an orientation film 113 is additionally formed thereon. Transparent electrodes 121 are formed on the transparent substrate 12, and these transparent electrodes 121 extend toward the area where the seal member 13 is formed, after extending toward the direction perpendicular to the transparent electrodes 111. An orientation film 123 is formed on the transparent electrodes 121, and a liquid crystal (not shown) injected between the orientation films 113 and 123 are controlled to be in a prescribed orientation state depending on the surface state of the orientation films.

Wiring lines 131b are formed with a given pattern at the right and left sides of the wiring lines 131a on the terrace area 11a. The wiring lines 131b extend on the transparent substrate 11 toward the area where the seal member 13 is formed. The seal member 13 is made of a material containing conductive particles in a resin, which displays anisotropic conductivity that shows electrical conductivity only along the direction of thickness of the substrate (the direction along the gap between the substrates) by being compressed between the transparent substrates 11 and 12. The transparent electrodes 121 overlap over the wiring lines 131b at a vertical-conductive crossover of the seal member 13, and the transparent electrodes are conductively connected to the wiring lines via the vertical-conductive crossover.

The tips of the wiring lines 131a and 131b are conductively connected to output terminals (not shown) of a driver IC 133 for addressing the liquid crystal via the anisotropic conductive film (not shown). A terminal pattern 134 is also formed on the terrace area 11a. One end of the terminal pattern 134 is conductively connected to the input terminals of the driver IC 133 via the anisotropic conductive film, and the other end of the terminal pattern 134 is condutively connected to a wiring member 136 such as a flexible wiring substrate or a TAB substrate.

Since the wiring lines 131a and 131b formed on the terrace area 11a have a small wiring width and formed with a fine pitch, they are susceptible to dust and acid besides involving a possibility to cause electrolytic corrosion, the entire packaging face of the terrace area 11a is coated with a resin molding material 141 comprising a silicone resin after packaging the driver IC 133 and the wiring member 136.

Since the liquid crystal device 1 has been required to be thin in accordance with recent trends of thinning and compacting electronic equipment, the thickness of the transparent substrates 11 and 12 comprising a glass are being in a trend to be thinned to comply with the foregoing requirements. However, thinning the transparent substrates 11 and 12 results in decreased strength of the substrates to make them to be easily broken, while arising a possibility that cracks are generated on the substrate particularly at the terrace area 11a where only the transparent electrodes 121 is protruding. Since the protrusion length of the terrace area 11a is larger in the COG (Chip On Glass) type liquid crystal device constructed by packaging the diver IC 133 on the terrace area 11a as described above, the possibility of generating cracks at the terrace area 11a is further increased.

Such drawbacks as described above may be solved by preventing local accumulation of stress by supporting a wide area of the terrace area 11a with a supporting member, when the liquid crystal device is packaged within the electronic equipment. However, since the entire packaging face of the terrace area 11a has been covered with the resin molding material 141 in the conventional liquid crystal device, it is difficult to uniformly support a wide area of the terrace area 11a. While supporting the liquid crystal device at the back face of the terrace area 11a that is not covered with the resin molding material 141 may be devised, this countermeasure is contradictory to the trend of thinning and compacting as hitherto described, because the thickness of the supporting structure of the liquid crystal device is increased.

The object of the present invention for solving the foregoing problems is to provide a liquid crystal device comprising a structure by which the terrace area of the liquid crystal device can be uniformly supported.

SUMMARY OF THE DISCLOSURE OF INVENTION

In a first embodiment, the present invention provides a liquid crystal device comprising: a pair of substrates opposed to one another via a seal member; a liquid crystal sealed in the inside area of the seal member between a pair of the substrates; electrodes formed within an inside area of the seal member of one of the pair of substrates; and an insulation film disposed on the electrode, wherein the outside area of the seal member of the one of the substrates comprises a terrace area that protrudes out of the end portion of the other substrate, the terrace area comprising wiring lines connected to the electrode, and wherein at least a part of the wiring lines is coated with an insulation film made of the same material as the foregoing insulation film.

According to the liquid crystal device of the first embodiment of the present invention, a resin molding step may be eliminated besides enabling the wiring lines to be securely protected from electrolytic corrosion without requiring additional manufacturing steps, by forming an insulation film on the liquid crystal seal area as well as on the surface of the terrace area so as to cover the wiring lines. In addition, since the surface of the terrace area can be flattened, the surface of the terrace area may be used for supporting the liquid crystal device or as a positioning face.

It is preferable for enhancing the protective property of the wiring lines to form the insulation film so as to be continuously extended from the liquid crystal seal area to the surface of the terrace area. The insulation film preferably serves as an overcoat layer formed within the liquid crystal seal area for preventing short circuit among the electrodes formed on the substrate due to mingled foreign substances such as dust.

The wiring lines preferably comprise an conductive connection member electrically connected to an integrated circuit or to a wiring member, and the conductive connection member is not covered with the insulation film in the first embodiment of the present invention, because an integrated circuit chip and a wiring member can be packaged on the conductive connection member.

It is also preferable in the liquid crystal device according to the first embodiment of the present invention that the wiring lines comprise an conductive connection member connected to the integrated circuit or to the wiring member, and the conductive connection member is not coated with the insulation film, because the integrated circuit chip and the wiring member may be packaged on the conductive connection member.

In the case as described above, it is desirable that an anisotropic conductive film is inserted between the conductive connection member and the integrated circuit or the wiring member, and at least the entire portion to be protected of the conductive connection member is coated with the anisotropic conductive film.

In the construction as described above, at least all the portions to be protected of the exposed wiring lines, for example the portions of the wiring lines having a small wiring pitch and wiring width, are coated with the anisotropic conductive film. Consequently, the protective property may be enhanced by protecting the portion not protected with the insulation film with the anisotropic conductive film. The portions to be protected as used herein refer, for example, to the wiring lines directly pulled out of the liquid crystal seal area, and the portions not to be protected refer, for example, to the wiring lines for constructing auxiliary terminals connected only to an integrated circuit, when the wiring lines directly pulled out of the liquid crystal seal area have been once connected to the integrated circuit packaged on the terrace area. The wiring pitch and wiring width of the latter wiring lines are usually formed to be larger than those of the former wiring lines.

Preferably, in the liquid crystal display device of the first embodiment of the present invention, the conductive connection member is connected to the integrated circuit or to the wiring member via an anisotropic conductive film, and the edge of the anisotropic conductive film overlaps the insulation film. Allowing the edge of the anisotropic conductive film to overlap the insulation film permits the wiring lines to be more securely protected, because no gaps are formed between the insulation film and the anisotropic conductive film. In addition, the possibility of generating the gaps are reduced by the overlap width at both end portions, even when the position for forming an insulation film pattern has been a little shifted from the position for coating with the anisotropic conductive film.

In the first embodiment, the present invention provides a method for manufacturing a liquid crystal device having a pair of substrates opposed to one another via a seal member, and a liquid crystal sealed in the inside area of the seal member between the pair of the substrates, one of the pair of substrates comprising a terrace area protruding out of the end portion of the other substrate, comprising the steps of: forming electrodes on one substrate of the pair of the substrates, and wiring lines connected to the electrodes on the terrace area; and forming an insulation film covering at least a part of the electrodes and the wiring lines.

In the manufacturing method as described above, the wiring lines may comprise an conductive connection member electrically connected to an integrated circuit or to a wiring member, and the conductive connection member may comprise no insulation film.

Preferably, the conductive connection member is connected to the integrated circuit or to the wiring member via an anisotropic conductive film, and the edge of the anisotropic conductive film overlaps the insulation film.

Preferably, a positioning mark is formed on one of the substrates, the edge of the insulation film is formed along one edge of the positioning mark, and the edge of the anisotropic conductive film is formed along the other edge of the positioning mark.

In the second embodiment, the present invention provides a liquid crystal device comprising: a pair of substrates opposed to one another via a seal member; a liquid crystal sealed in the inside area of the seal member between a pair of the substrates; electrodes formed within an inside area of the seal member of one of the pair of substrates; an overcoat layer formed on the electrode; and an orientation film formed on the overcoat layer, wherein the outside area of the seal member of one of the substrates comprises a terrace area protruding out of the end portion of the other substrate, the terrace area comprising wiring lines connected to the electrode, and the wiring lines comprising the overcoat layer and the orientation film formed thereon, and wherein the entire overcoat layer is covered with the orientation film on the terrace area.

In the liquid crystal device according to the second embodiment of the present invention, the overcoat layer region covers the electrodes both on the opposed face and on the terrace area, and the entire area is covered with the orientation film. Since there remains no open surface where the overcoat layer is exposed to the outside, cloths to be used for the rubbing treatment does not make direct contact with the overcoat layer when the orientation film is subjected to a rubbing treatment. Consequently, the orientation film is not damaged with powders (dusts) arising from the shaved overcoat layer, thereby enabling dirt and flaws to be prevented from generating to consequently prevent irregular images of the liquid crystal display from occurring.

The overcoat layer may be formed of silicon oxide, titanium oxide, or a mixture containing at least one of them, and the orientation film may be formed of a polyimide resin in the method for manufacturing the liquid crystal device according to the second embodiment of the present invention.

In the second embodiment, the present invention provides a method for manufacturing a liquid crystal device having a pair of substrates opposed to one another via a seal member, and a liquid crystal sealed in the inside area of the seal member between the pair of substrates, one of the pair of substrates comprising a terrace area protruding out of the end portion of the other substrate, comprising the steps of:

forming electrodes on one of the pair of substrates, and wiring lines connected to the electrode on the terrace area; forming an overcoat layer on the electrodes and on the wiring lines; forming an orientation film on the overcoat layer; and applying a rubbing treatment to the orientation film, wherein entire overcoat layer is covered with the orientation film on the terrace area.

In the third embodiment, the present invention provides a liquid crystal device comprising: a pair of substrates opposed to one another via a seal member; electrodes formed within the inside area of the seal member of the pair of substrates; and an insulation layer formed on the electrodes of one of the pair of substrates, wherein the outside area of the seal member of one of the substrates comprises a terrace area protruding out of the end portion of the other substrate; wherein the terrace area comprises wiring lines electrically connected to the electrodes provided on the other substrate via an conductive connection member, at least a part of the wiring lines being coated with the insulation layer, and wherein the insulation layer is formed on the area except the corresponding sites to the conductive connection member.

According to the liquid crystal device in the third embodiment of the present invention, an insulation layer is also formed on the terrace area by taking advantage of the insulation layer formed on the liquid crystal area of the substrate. Accordingly, electrolytic corrosion of the wiring lines located on the terrace area can be securely prevented from appearing, as compared with the method in which a mold material such as silicone is adhered on the terrace area after forming a liquid crystal panel. Moreover, the electrodes on one of the substrates can be securely connected to the wiring lines on the other substrate with the conductive connection member without being blocked by the insulation layer, since the conductive connection member on the substrate of the liquid crystal device comprises no insulation layer.

The insulation layer preferably contains at least either the overcoat layer covering the electrode, or the orientation film formed above the electrode.

In the fourth embodiment, the present invention provides a liquid crystal device comprising: a pair of substrates opposed to one another via a seal member; electrodes formed within the inner area of the seal member of one of the pair of substrates; and an insulation film formed on the electrode, wherein the outside area of the seal member of one of the substrates comprises a terrace area protruding out of the end portion of the other substrate; the terrace area comprises a packaging area in which wiring lines connected to the electrodes and an outer circuit including ICs for addressing the liquid crystal device are packaged; at least a part of the wiring lines are coated with an insulating film made of the same material as the foregoing insulation film; and a mold member is disposed on the wiring lines formed between the packaging area and the seal member.

According to the liquid crystal device in the fourth embodiment of the present invention, an insulation layer is also formed on the terrace area of the substrate by taking advantage of the insulation layer formed on the liquid crystal area of the substrate. Accordingly, electrolytic corrosion of the wiring lines located on the terrace area can be securely prevented from appearing, as compared with the method in which a mold material such as silicone is adhered on the terrace area after forming a liquid crystal panel. In addition, since the insulation layer is formed on the area except the tuning-on inspection area when the insulation layer is formed on the terrace area, there is no hindrance in carrying out the turn-on inspection after forming the insulation layer, by utilizing the turn-on inspection area, or the wiring lines exposed to the outside in the area between the IC packaging area and the seal member.

In the fourth embodiment, the present invention provides a method for manufacturing a liquid crystal device comprising a pair of substrates opposed to one another via a seal member, one of the pair of substrates comprising a terrace area protruding out of the end portion of the other substrate, comprising the steps of: forming electrodes on one of the pair of substrates, the terrace area comprising wiring lines connected to the electrode; forming an insulation film covering at least a part of the electrodes and the wiring lines; adhering one of the substrates to the other substrate; inspecting turn-on of the liquid crystal device using the wiring lines; and molding the wiring lines in the area used for the turning-on inspection.

In the fifth embodiment, the present invention provides a liquid crystal device comprising: a pair of substrates opposed to one another via a seal member; and an orientation film provided at the inner face side of one of the pair of substrates, wherein the outside area of the seal member of one of the substrates comprises a terrace area protruding out of the end portion of the other substrate, the terrace area comprising wiring lines pulled out of the inside area of the seal member; and wherein at least a part of the wiring lines is covered with an insulation film, at least the edge of the insulation film being covered with the orientation film.

Since at least a part of the wiring lines is covered with the insulation film, and at least the edge of the insulation film is covered with the orientation film in the liquid crystal device according to the fifth embodiment of the present invention, the wiring lines are coated with the portions where the insulation film and the orientation film have been formed to protect the wiring lines from electrolytic corrosion, besides forming an approximately flat surface area. Consequently, impact resistance of the liquid crystal device may be improved by preventing the substrate from being broken without sacrificing corrosion resistance, because the terrace area may be evenly supported. The effect of the edge portion of the insulation film on orientation in the liquid crystal seal area may be reduced when the orientation film is subjected to an orientation treatment, because the orientation film is formed so as to cover the edge portion of the insulation film.

As described in the liquid crystal device according to the first to fourth embodiments, the portion coated with the insulation film and the orientation film on the terrace area include the portion except the connection portion of the wiring member on the terrace area, in addition to the packaging area of the integrated circuit (ICs) and additionally the vertical-conductive crossover area. The electrical inspection area against the wiring lines may be sometime excluded. The portion not coated with the insulation film and the orientation film may be exposed, or may be sealed with a resin molding material.

In the liquid crystal device according to the fifth embodiment of the present invention, the inside area of the seal member of one of the substrates may comprise electrodes for applying an electric field to the liquid crystal, the orientation film being provided on the electrode, and a protective film may be provided between the electrodes and the orientation film, the protective film being made of the same material as the insulation film.

The construction as described above enables the insulation film and the protective film to be simultaneously formed. Therefore, both films may be formed merely by changing a film deposition pattern without providing any separate steps, enabling the liquid crystal device to be manufactured without any cost increment.

Preferably, the orientation film is formed so as to cover the entire insulation film in the liquid crystal device according to the fifth embodiment of the present invention.

Since the orientation film is formed so as to cover the entire insulation film, the effect of the insulation film on orientation of the liquid crystal may be further reduced.

Preferably, the terrace area comprises a positioning mark, the insulation film is formed along one of the outer edge of the positioning mark, and the orientation film is formed along the other outer edge of the positioning mark in the liquid crystal device according to the fifth embodiment of the present invention.

The construction as described above allows the positioning mark to serve for positioning of the insulation film as well as positioning of the orientation film, enabling the positional relation between the insulation film and the orientation film to be determined with high precision. In particular, the edge of the insulation film may be accurately and securely covered.

Preferably, one of the outer edge is formed to be opposite to the other outer edge in the liquid crystal device according to the fifth embodiment of the present invention.

The insulation film and the orientation film may be more precisely deposited by positioning them relative to a pair of the parallel outer circumferences of the positioning mark in opposed relation to one another.

Preferably, the positioning mark is made of the same material as the wiring lines in the fifth embodiment of the present invention.

According to the present invention, no separate steps are required for forming the positioning mark and the wiring lines because they may be simultaneously formed, besides enabling the insulation film and the orientation film to be formed with high precision relative to the wiring pattern.

It is preferable that the terrace area not coated with the insulation film is sealed with a resin molding material in the liquid crystal device according to the fifth embodiment of the present invention.

According to the present invention, short circuit of the wiring lines may be completely prevented by sealing the terrace area not coated with the insulation film with the resin molding material, and electrical inspection of the wiring lines, packaging of ICs, and conductive connection of the wiring member can be executed without any hindrance before molding with the resin.

It is preferable in the liquid crystal device according to the fifth embodiment of the present invention that an opening portion is provided on the insulation film and the orientation film for forming an vertical-conductive crossover between a pair of the substrates.

According to the present invention, the pattern for forming the insulation film and the orientation film is less restricted by the disposition of the vertical-conductive crossover to enable the optimum film forming pattern to be freely designed, by providing an opening portion on the insulation film and the orientation film in order to form the vertical-conductive crossover for conductively connecting the electrodes on the other substrate to the wiring lines formed on the terrace area. It is preferable in this case that the opening portion on the insulation film is formed to be a size larger than the opening portion on the orientation film, so that al the edge of the opening portion on the insulation film is covered with the orientation film. The protective film and the insulation film may be integrated to one another, and the opening portion may be formed at near the boundary between the both films, when the insulation film also serves as the protective film. Otherwise, the orientation film within the liquid crystal seal area may be integrated with the orientation film on the terrace area, and the opening portion may be formed at near the boundary between them.

In the fifth embodiment, the present invention provides a method for manufacturing a liquid crystal device having a pair of substrates opposed to one another via a seal member, one of the pair of substrates comprising a terrace area protruding out of the end portion of the other substrate, comprising the steps of: forming electrodes on one of the pair of substrates, the terrace area comprising wiring lines connected to the electrode; forming an insulation film covering at least a part of the electrodes and the wiring lines, and forming an orientation film being on the insulation film, wherein the edge of the insulation film is covered with the orientation film on the terrace area.

According to the method for manufacturing the liquid crystal device in the fifth embodiment of the present invention, short circuit may be prevented by the portion on which the insulation film and the orientation film have been formed, besides enabling a flat surface area to be formed, since at least a part of the wiring lines are coated with the insulation film and at least the edge of the insulation film is covered with the orientation film. Consequently, the substrate is protected from being broken to improve impact resistance of the liquid crystal device without compromising corrosion resistance, since the terrace area can be evenly supported. The effect of the edge portion of the insulation film on orientation within the liquid crystal seal area may be reduced when the orientation film is subjected to an orientation treatment, by forming the orientation film so as to cover the edge of the insulation film. Increase of the manufacturing cost may be suppressed by simultaneously forming the protective film within the liquid crystal seal area and the insulation film, and by simultaneously forming the orientation film on the liquid crystal seal region and the orientation film on the terrace area, since the films may be formed by merely changing the film deposition pattern without adding any new steps.

Preferably, the method for manufacturing the liquid crystal device according to the fifth embodiment of the present invention further comprising the step of forming a positioning mark on one of the substrates, wherein the insulation film is formed along one of the outer edges of the positioning mark, and the orientation film is formed along the other outer edge.

BRIEF DESCRIPTION OF THE DRAWINGS

FIG. 8 is a cross sectional side view showing the cross sectional structure of the main part of the liquid crystal device according to the second embodiment.

FIG. 16(a) is a plane view showing one example of the electrodes formed on one of the substrates constituting the liquid crystal device according to the third embodiment.

FIG. 16(b) is a plane view showing one example of the electrodes formed on the other substrate constituting the liquid crystal device in opposed relation to the substrate shown in FIG. 16(a) according to the third embodiment.

DETAILED DESCRIPTION OF THE PREFERRED EMBODIMENTS

Figure 1:
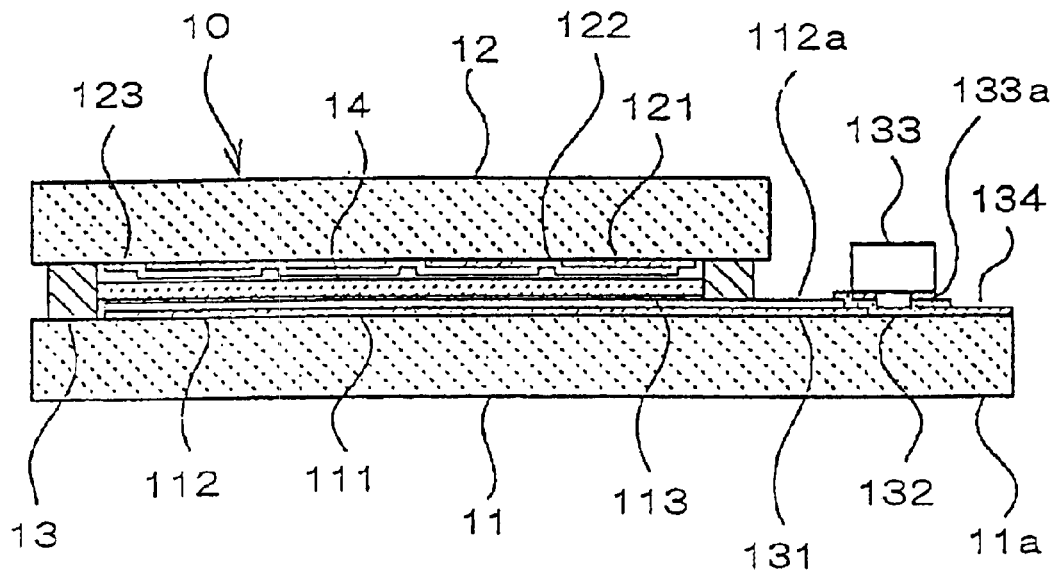
FIG. 1 is a schematic cross section illustrating the structure of the liquid crystal device according to the first embodiment.

The liquid crystal device and the method for manufacturing thereof according to the first embodiment of the present invention will be described in detail hereinafter. FIG. 1 is a schematic cross section illustrating the structure of the liquid crystal device according to the first embodiment. This structure is basically similar to the structure of the foregoing conventional liquid crystal structure, wherein the substrates 11 and 12, seal member 13, liquid crystal 14, electrodes 111 and 121, insulation films 112 and 122, orientation films 113 and 123, wiring lines 131 and 134, anisotropic conductive film 132, and integrated circuit chip 133 are similar to those shown in FIGS. 7 and 8.

The insulation film 112 formed so as to coat the electrodes 111 is pulled out of the liquid crystal seal area surrounded by the seal member 13 through under the seal member 13 onto the surface of the terrace area 11a. The wiring lines 131 is covered with an extended formation portion 112a of the insulation film 112 formed on the surface of the terrace area 11a of the insulation film 112.

Figure 2:
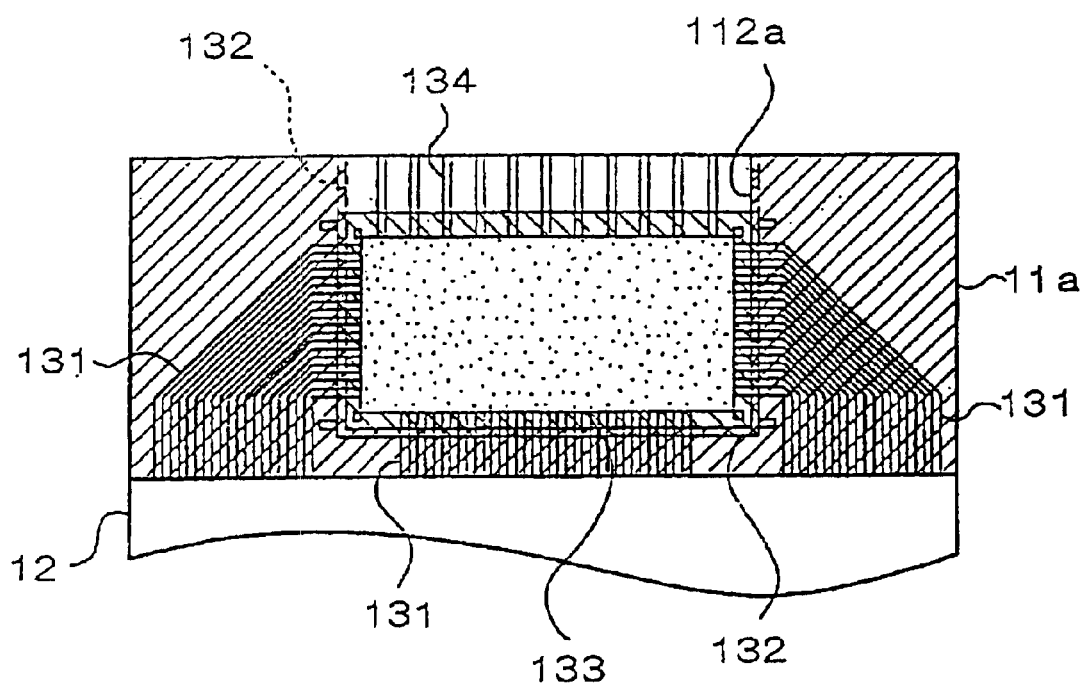
FIG. 2 is an enlarged plane view schematically illustrating the surface structure of the terrace area according to the first embodiment.

FIG. 2 is a plane view showing the terrace area 11a according to this embodiment. In this drawing, the extended formation portion 112a of the insulation film 112 corresponds to the area marked by oblique lines extending toward the upper-right in the drawing, and covers major portions of the wiring lines 131. This extended formation portion 112a is formed so as to shun the area where the integrated circuit chip 133 is formed, and its vicinity. In other words, the vicinity of the connection parts are not covered with the insulation film 112 so that each of the wiring lines 131 is put into conduction with the bump electrodes 133a of the integrated circuit chip 133. Each of the wiring lines 131 is conductively connected to the bump electrodes 133a of the integrated circuit chip 133 via an anisotropic conductive film (for example, a film in which minute conductive particles (such as resin balls plated with gold) are dispersed in a thermoplastic resin) 132, which is deposited on the portion marked by oblique lines extending toward upper-left in the drawing under the integrated circuit chip 133. The anisotropic conductive film 132 is deposited so that its end portion overlaps the end portion of the extended formation portion 112a.

The wiring lines 134 are left naked since they are seldom affected by electrolytic corrosion, because the wiring lines 134 has a larger line width and smaller number of terminals as compared with the wiring lines 131 as hitherto described. In addition, since the wiring lines 134 are so constructed as to be able to make a press contact with a connector (not shown) comprising an anisotropic conductive rubber, they are also left naked to enable conductive connection to be achieved. Alternatively, the wiring lines 134 may be put into conductive connection with a wiring member such as a flexible wiring substrate via the anisotropic conductive film.

Figure 3:
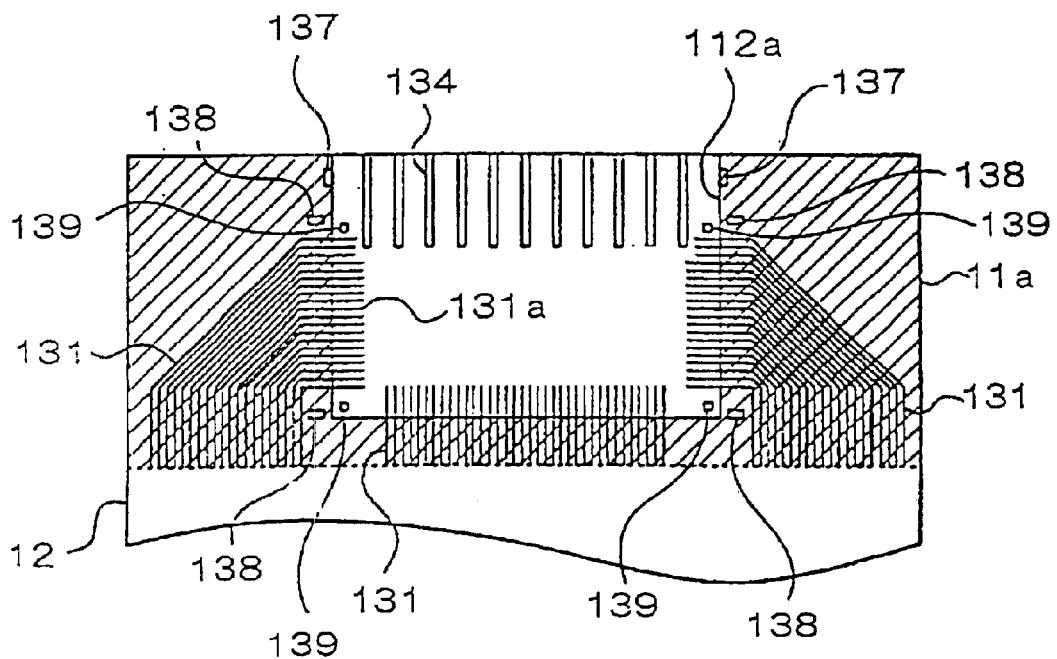
FIG. 3 is an enlarged plane view schematically illustrating the insulation film formed on the surface of the terrace area according to the first embodiment.
Figure 4:
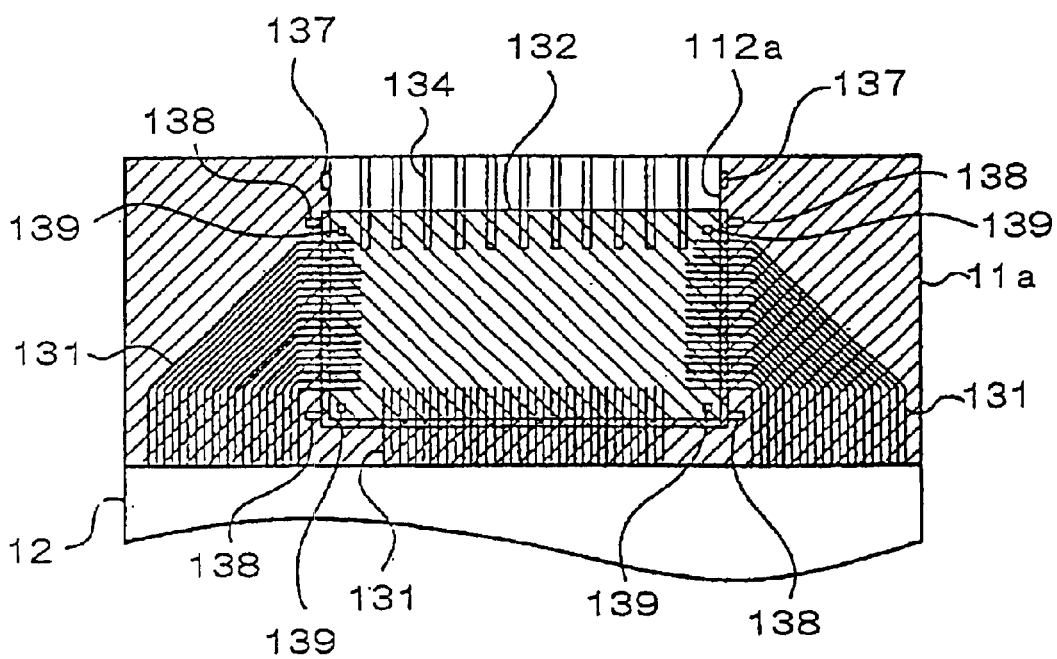
FIG. 4 is an enlarged plane view schematically illustrating the anisotropic conductive film deposited on the surface of the terrace area according to the first embodiment.

The procedure for manufacturing the foregoing structure will be then described with reference to FIGS. 3 and 4. In the first step, The electrode layer 111, and wiring lines 131 and 134 as shown in FIG. 1 are formed by depositing a transparent conductive material such as ITO (Indium Tin Oxide) on the surface of the substrate 11 by a PVD method such as vacuum evaporation and sputtering and by pattering using such as a known photolithograpy. They may be selectively formed by the PVD method using a shield mask. Only the surface of the terrace area 11a (or the surface to serve as the terrace) of the surface of the substrate 11 is illustrated in FIG. 3. Positioning marks 137, 138, and 139 are also formed together with the electrode layer 111 and wiring lines 131 and 134 using the same material and same manufacturing method as used for forming the electrode layer and wiring lines. The positioning mark 137 defines the position of the edge of the extended formation portion 112a, the positioning mark 138 defines the position of the edge of the anisotropic conductive film 132, and the positioning mark 139 defines the position of the edge of the integrated circuit chip 133. The tips of the wiring lines 131 not covered with the extended formation portion 112a (the area not marked with the oblique lines) serve as connection terminals 131a to be conductively connected to the bump electrodes 133a of the integrated circuit chip 133 via the anisotropic conductive film 132.

In the next step, the insulation film 112 is formed within the liquid crystal seal area of the substrate 11. The insulation film 112 is also simultaneously formed on the surface of the terrace area 11a as the extended formation portion 112a. The insulation film 112 is formed by the sputtering method or oxidation method of $SiO_2$ or $TiO_2$. This insulation film 112 is also formed into a prescribed pattern on the surface of the substrate 11 by patterning or by selective deposition using a shield mask. The insulation film is positioned so that the edge of the extended formation portion 112a matches the positioning mark 137 during patterning or selective deposition. The positioning mark 137 is used in order to position the edge of the extended formation portion 112a confronting the packaging area of the integrated circuit chip 133 in the example shown in FIG. 3. The exposure mask and the shield mask are positioned for patterning and selective deposition, respectively, by sensing the position of the positioning mark 137 in a surface image using an image processing technique known in the art after taking the surface image of the substrate 11 using a camera.

In the next step, the orientation film 113 shown in FIG. 1 is formed on the surface of the substrate 11, and the substrate 11 is bonded to the substrate 12 on which the electrode layer 121, insulation film 122 and orientation film 123 have been formed via a seal member 13 as shown FIG. 1 after subjecting the orientation film 113 to an orientation treatment known in the art, followed by injecting and sealing the liquid crystal 14 to complete a liquid crystal cell. The anisotropic conductive film 132 is then deposited on the terrace area 11a as shown in FIG. 4 by taking advantage of the positioning mark 138. The outer edge 132b of the anisotropic conductive film 132 is disposed at the outside of the center of the anisotropic conductive film 132 from the outer edge 112b of the extended formation portion 112a depending on the positional relation between the positioning marks 137 and 138. Consequently, the edge of the anisotropic conductive film 132 overlaps the edge of the extended formation portion 112a.

Figure 5:
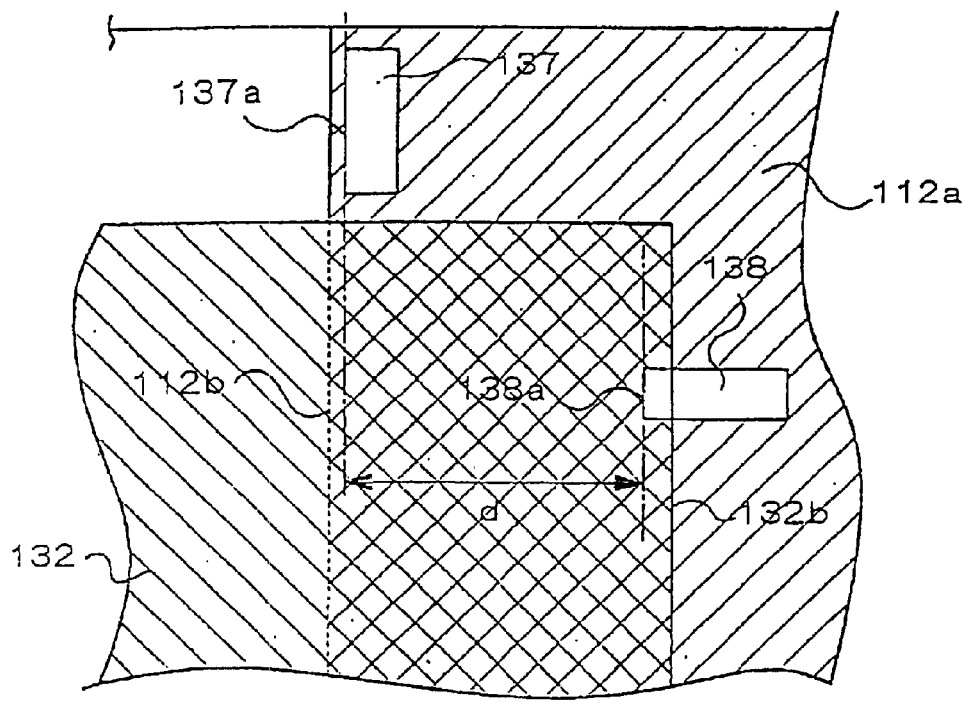
FIG. 5 is an enlarged drawing for illustrating the location of the positioning mark according to the first embodiment.

FIG. 5 illustrates the relation between the positioning marks 137 and 138, and the edges of the extended formation portion 112a and the anisotropic conductive film 132. The left side circumference edge 137a of the positioning marks 137 is set to be a reference for defining the position of the outer edge 112b of the extended formation portion 112a, and the left side circumference edge 138a of the positioning mark 138 is set to be a reference for defining the outer edge 132b of the anisotropic conductive film 132. Accordingly, the edge of the extended formation portion 112a is designed so as to overlap the edge of the anisotropic conductive film 132 by a width $\underline{d}$ between the circumference edges 137a and 138a. This width $\underline{d}$ is determined by taking the patterning accuracy for depositing the insulation film 112 and deposition accuracy of the anisotropic conductive film 132 into consideration, and is designed not to arise a gap between the extended formation portion 112a and the anisotropic conductive film 132, even when the patterns and deposition sites have been shifted in a certain degree.

Figure 6:
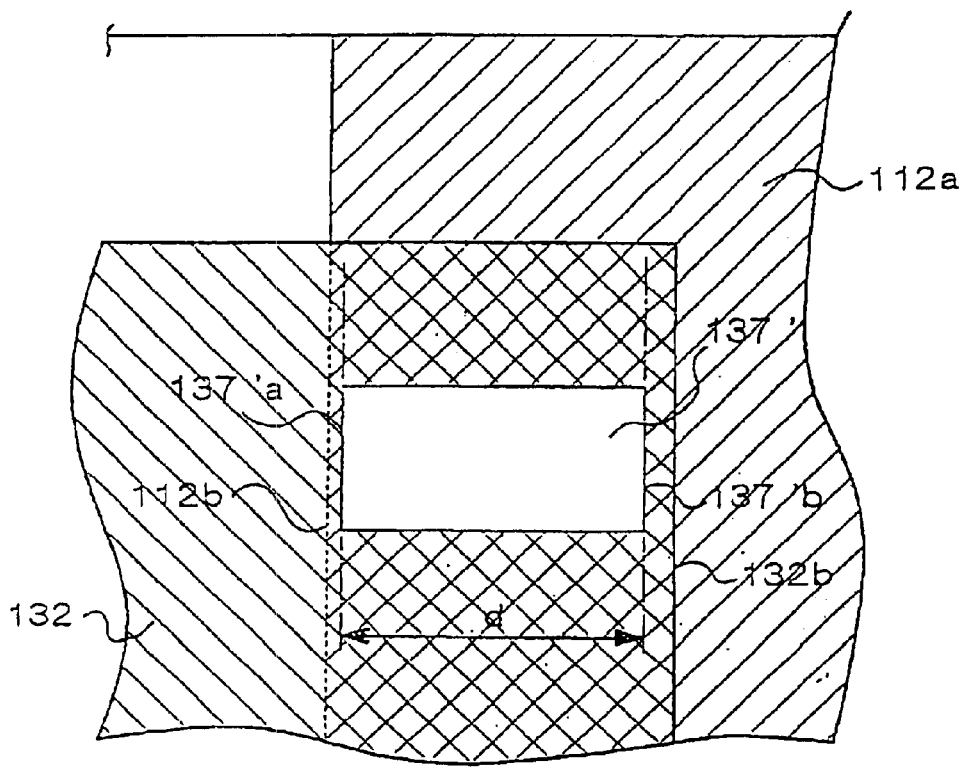
FIG. 6 is an enlarged drawing for illustrating a variation of the positioning mark according to the first embodiment.

FIG. 6 shows an another example for forming the positioning marks. The positioning mark 137f in this drawing is designed so that the circumference edge 137fa of the positioning mark 137f at the left side in the drawing defines the position of the outer edge 112b of the extended formation portion 112a, and the circumference edge 137fb at the right side in the drawing defines the outer edge 132b of the anisotropic conductive film 132.

As hitherto described, the integrated circuit chip 133 shown in FIG. 2 is mounted on the anisotropic conductive film 132 after depositing the anisotropic conductive film 132, and is positioned so that a plurality of the bump electrodes 133a of the integrated circuit chip 133 correspond to the connection terminals of the wiring lines 131 on the surface of the terrace area 11a via the anisotropic conductive film 132. The integrated circuit chip 133 and the terrace area 11a are pressed to one another with a heat-compression apparatus (not shown) with simultaneous heating. The base resin of the anisotropic conductive film 132 softened by heating is compressed by the compressing force, and the conductive particles dispersed in the base resin permits the terminals of the integrated circuit chip 131 to be electrically connected to the connection terminals of the wiring lines 131.

The conductive connection structure and heat-compression bonding method using the anisotropic conductive film is the same in direct conductive connection of wiring members to the wiring lines 131, not only in conductive connection of the wiring lines 134 to the flexible wiring substrate 136 as the wiring member as shown in FIG. 8, or in the foregoing COG structure.

The insulation film 112 formed within the liquid crystal seal area is extended onto the terrace area 11a in the first embodiment. In other words, the insulation film 112 formed within the liquid crystal seal area is continuous to the extended formation portion 112a in order to enhance protected state with the insulation film, such as prevention of electrolytic corrosion of the wiring lines. However, the insulation film 112 may be formed into mutually isolated two portions of the insulation film formed within the liquid crystal seal area, and the extended formation portion 112a on the surface of the terrace area 11a in the present invention.

While the insulation film 112 as an overcoat layer is formed on the surface of the terrace area 11a in order to prevent short circuit of the liquid crystal device in the foregoing first embodiment, forming an insulation film other than the overcoat layer on the surface of the terrace area 11a is effective as well. Otherwise, the orientation film 113 may be formed on the surface of the terrace area 11a in place of the extended formation portion 112a, because the orientation film 113 also has an insulating property.

While only the wiring lines 131 to be protected, of the wiring lines 131 and 134 formed on the surface of the terrace area 11a and not coated with the extended formation portion 112a, is completely coated with the anisotropic conductive film 132 in the first embodiment, the anisotropic conductive film 132 may be deposited so as to completely cover the wiring lines 134 as well as shown by the dotted lines in FIG. 2. This means that the anisotropic conductive film 135 is formed to be integrated with the anisotropic conductive film 132 as shown in FIG. 8, thereby the wiring lines are completely coated with the anisotropic conductive films.

The liquid crystal device according to the present invention is not restricted to those illustrated in the drawings, but it is needless to say that various modifications are possible within a range not departing from the spirit of the present invention.

Figure 7:
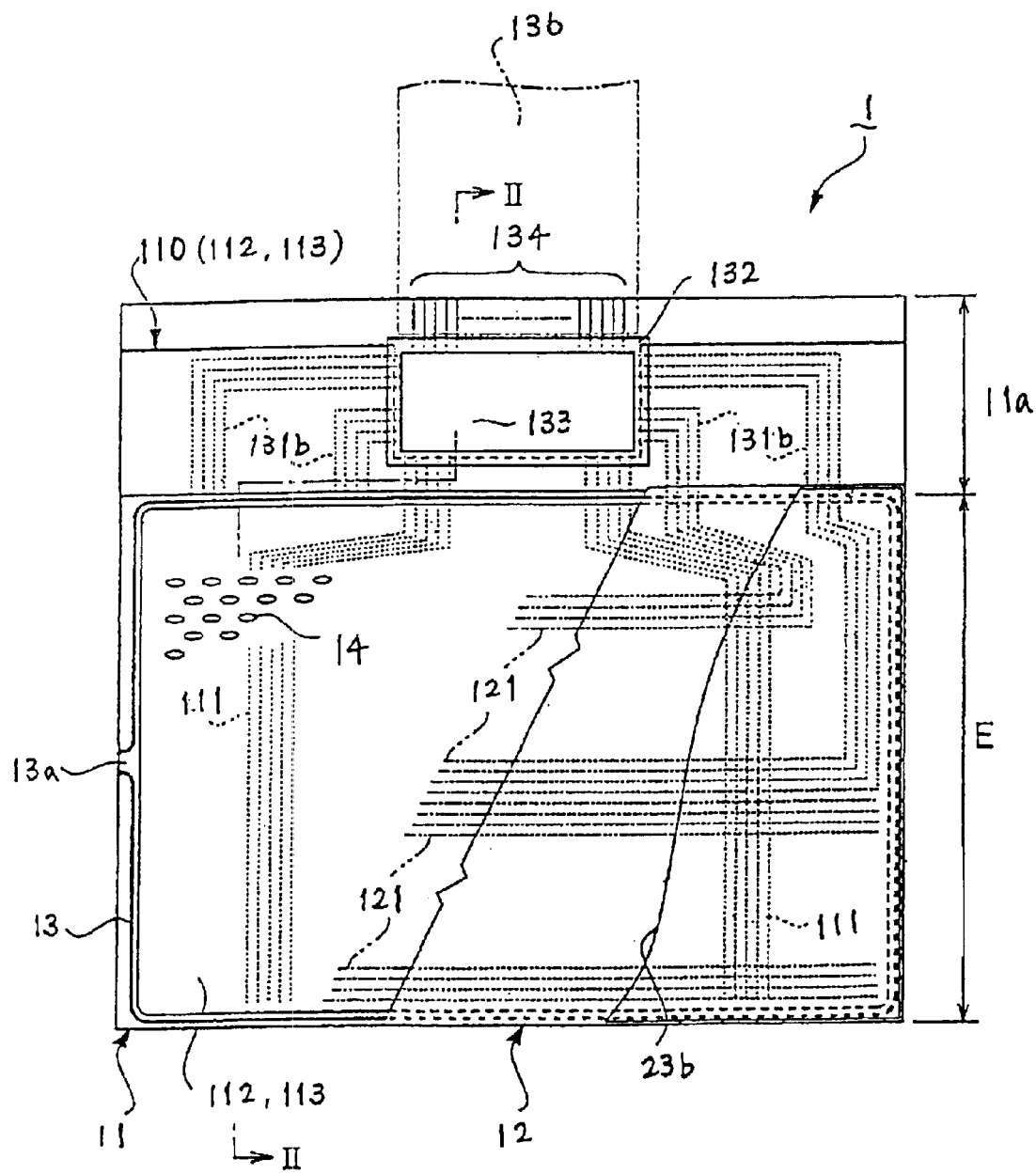
FIG. 7 is a partially cut-away plane view of the liquid crystal device according to the second embodiment.

FIGS. 7 and 8 show the second embodiment of the liquid crystal device according to the present invention. This liquid crystal device 1 comprises a pair of substrates 11 and 12, and the circumferences of them are bonded to one another with a seal member 13. These substrates 11 and 12 are constructed by mounting various elements on virgin substrates 11a and 12a made of a glass or a flexible material such as a plastic.

The dimension of a gap formed between these substrates 11 and 12, so called a cell gap, is determined to be uniform, for example about 5 μm, with a plurality of spacers 15, and a liquid crystal 14 is sealed within the cell gap surrounded by the seal member 13. The member denoted by the reference numeral 13a in FIG. 7 is a liquid crystal injection port formed at a part of the seal member 13. The liquid crystal 14 is injected into the cell gap through the liquid crystal injection port 13a, which is sealed with a resin after completing injection of the liquid crystal.

First electrodes 111 are formed on the surface at the liquid crystal side of the first substrate 11, an overcoat layer 112 as an insulation layer is formed thereon, and an orientation film 113 is additionally formed on the overcoat layer. Second electrodes 121 are formed on the surface at the liquid crystal side of the second substrate 12 opposed to the first substrate 11, an overcoat layer 122 is formed thereon, and an orientation film 123 is additionally formed on the overcoat layer. Polarizing plates 23a and 23b are adhered on the outer surfaces of the substrates 11 and 12, respectively.

The first and second electrodes 111 and 121 are formed to be a thickness of 500 to 1500 angstroms using, for example, ITO (Indium Tin Oxide). The overcoat layers 112 and 122 are formed to be a thickness of about 600 angstroms using, for example, silicon oxide or titanium oxide. The orientation films 113 and 123 are formed to be a thickness of about 300 angstroms using, for example, a polyimide resin.

The first electrodes 111 are formed by arranging a plurality of linear patterns in parallel to one another, while the second electrodes 121 are formed by arranging a plurality of linear patterns in parallel to one another and perpendicular to the first electrodes 111. The points where these first electrodes 111 and the second electrodes 121 cross to form a matrix corresponding to pixels for image display.

The first substrate 11 comprises a terrace 11a protruding out of the liquid crystal area E for sealing the liquid crystal 14, or protruding out of the other substrate. The first electrodes 111 on the first substrate 11 continuously extends onto the terrace 11a to form a wiring pattern. The second electrodes 121 on the second substrate 12 are put into conductive connection with the electrodes on the first substrate 11 via conductive materials 20 (FIG. 8) dispersed within the seal member 2, and is pulled out onto the terrace 11a of the substrate to form a wiring pattern.

Each electrode having a wiring line electrically connecting to both substrates on the terrace 11a of the first substrate 11 is shown as a wiring pattern in the second embodiment. Input terminals 134 for electrically connecting to an auxiliary circuit 136 is formed as a part of the wiring lines at the periphery of the terrace 11a on the first substrate 11.

The electrodes 111 and 121, and the wiring portion 131b actually contain a number of wiring lines with a very narrow spacing on the entire surface area including the cross sections of the substrates 11 and 12 in the drawings including FIG. 7 and those to be described hereinafter. However, these electrodes are illustrated with a wider spacing than the actual spacing in FIG. 7 and in the drawings thereafter for easy understanding of their structures, and a part of the electrodes are omitted in the drawing. The electrodes 111 and 121 in the liquid crystal area E are not always formed as linear patterns, but may be formed into appropriate patterns.

While the input terminals 134 are actually formed with a narrow and constant spacing at the terminal edge of the terrace 11a of the substrate 11, they are illustrated with a wider spacing than the actual spacing in FIG. 7 for easy understanding of the structure, and a part of the terminals are omitted in the drawing.

A liquid crystal addressing IC 133 is adhered, or packaged, with ACF (anisotropic Conductive Film) 132 as a conductive adhesive at an appropriate site of the terrace 11a of the substrate. The well known ACF 132 is a conductive polymer film for collective electrical continuity between a pair of terminals with anisotropic conductance, which is formed by dispersing a lot of conductive particles 132b, for example, in a thermoplastic or thermosetting resin. Unidirectional conductive connection between the bumps 133a of the liquid crystal addressing IC 133 and the wiring lines 131b, and between the bumps 133a and the input terminals 134 are achieved by heat-compressing the terrace 11a of the substrate and the liquid crystal addressing IC 133 with the ACF 132 inserted between them.

The light passing through selected pixels is modulated by applying a scanning voltage on each column of either the first electrodes 111 or the second electrodes 121, and by applying a data voltage on the other electrodes based on the display image, thereby images such as letters or numerals are displayed at the outside of the substrate 11 or 12.

Figure 9B:
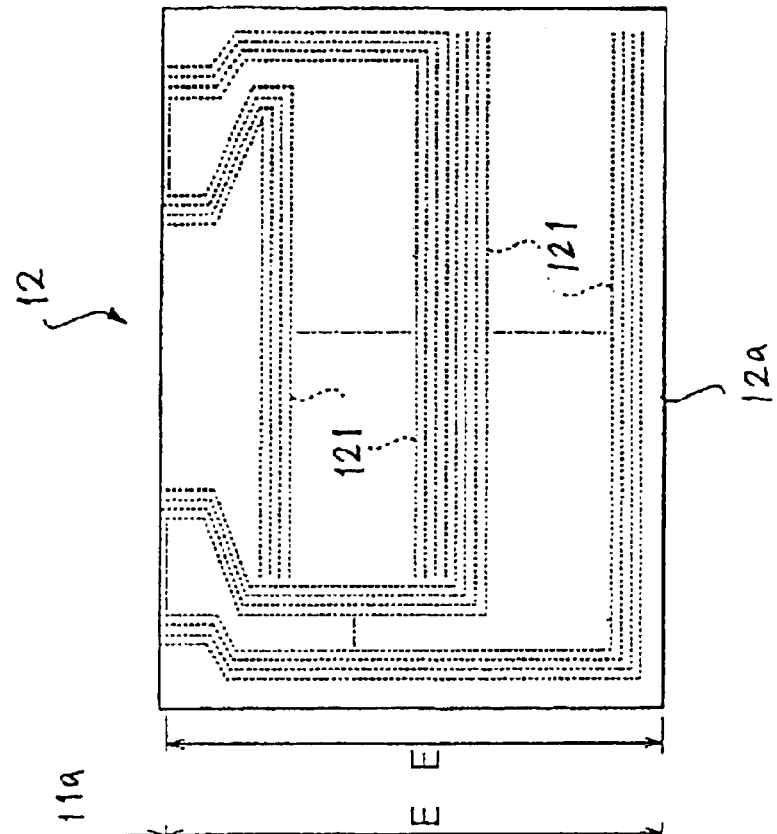
FIG. 9(b) is a plane view showing one example of the electrodes configuration formed on the other substrate constituting the liquid crystal device in opposed relation to the substrate shown in FIG. 9(a) according to the second embodiment.
Figure 9A:
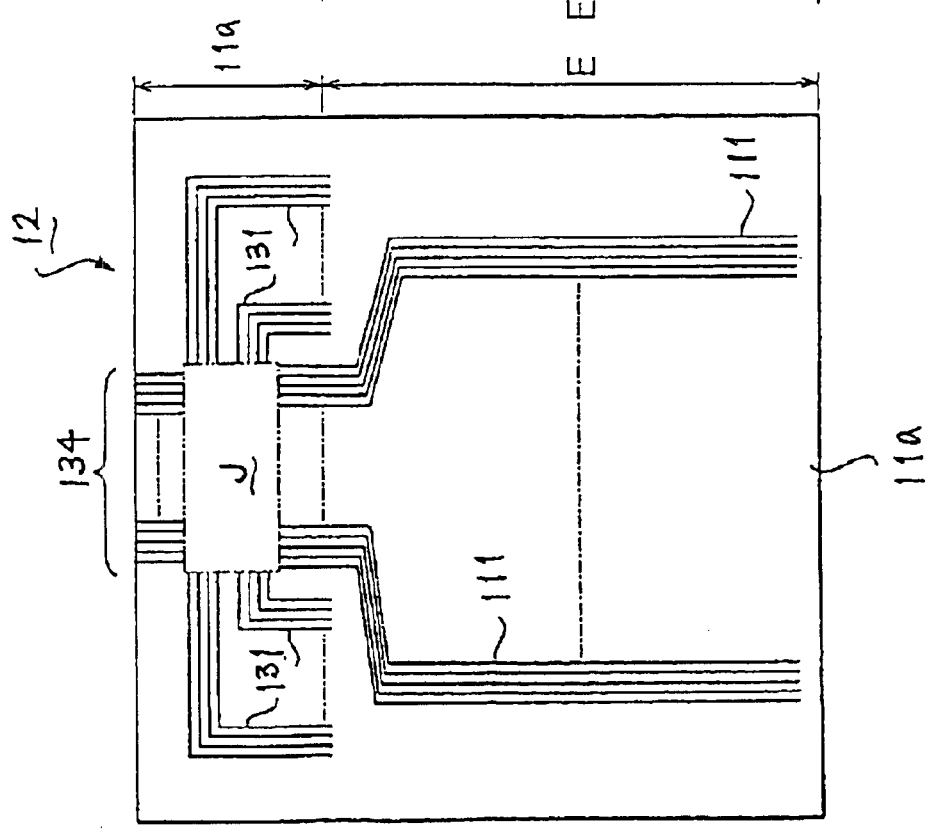
FIG. 9(a) is a plane view showing one example of the electrodes configuration formed on one of the substrates constituting the liquid crystal device according to the second embodiment.
Figure 10:
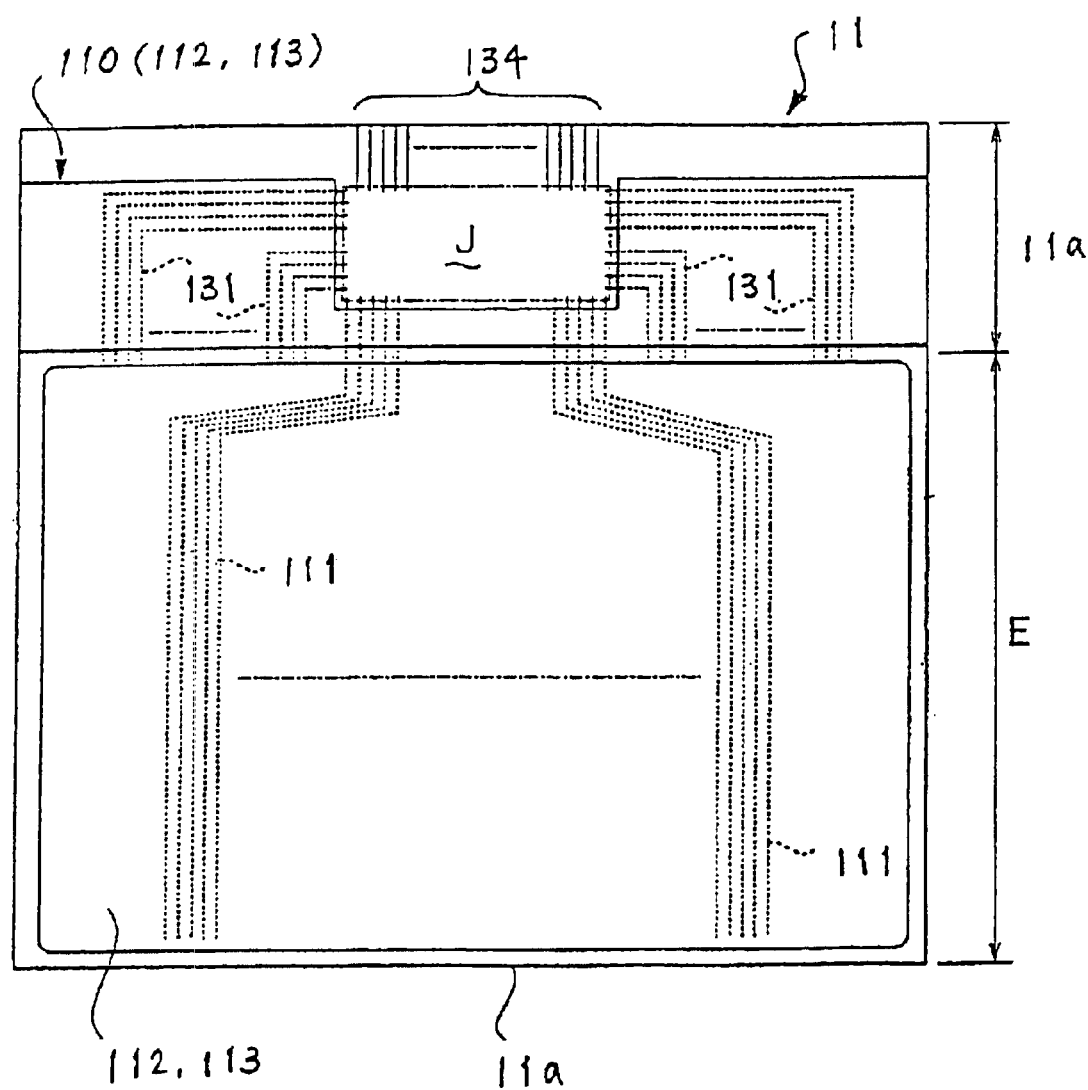
FIG. 10 is a plane view showing the insulation layer formed on the surface of the substrate of an intermediate product according to the second embodiment.

In FIG. 9(a), the electrodes 111, wiring pattern 131b and input terminals 134 are formed on the virgin substrate 11a constituting one of the substrate 11. With respect to the intermediate product of the substrate 11 as shown herein, an insulation layer 110 is formed on the surface of the terrace 11a of the substrate so as to cover the entire wiring pattern 131b as shown in FIG. 10. This insulation layer 110 comprises a first insulation layer 112 that is simultaneously formed in forming the overcoat layer 112 on the liquid crystal area E of the first substrate 11, and a second insulation layer 113 that is simultaneously formed in forming the orientation film 113 on the liquid crystal area E. Preventing the wiring pattern 131 on the terrace 11a of the substrate from being exposed to the outside with the insulation layer 112 may protect the wiring pattern 131 from electrolytic corrosion. FIG. 9(b) shows the electrodes 121 formed on the surface of the virgin substrate 12a constituting the other substrate 12. The overcoat layer 122 is formed on the substrate 12 shown in this drawing so as to cover the electrodes 121 formed in the liquid crystal area E that is an area overlapping the substrate 11.

The overcoat layers 112 and 122 are usually formed of silicon oxide or titanium oxide that is harder than polyimide constituting the orientation films 113 and 123. However, these overcoat layers may be shaved by an external force applied during rubbing treatment against the orientation films 113 and 123. Consequently, the first layer 112 is shaved off by rubbing treatment when the portion, where the first insulation layer 112 that serves as the overcoat layer 112 is not coated with the second insulation layer 113, remains on the terrace 11a of the substrate. Shaving debris adheres as dirty stripes or unnecessarily scratches on the orientation film 113 within the liquid crystal area E, causing deterioration of image quality of the liquid crystal.

As a countermeasure for the adverse effect described above, the entire surface of the first insulation layer 112 made of the same material as the overcoat layer 112 is covered with the second insulation layer 113 made of the same material as the orientation film 113. In particular, as shown in FIG. 2, the periphery of the first insulation layer 112 is completely wrapped by forming the second insulation layer 113 elongating toward the downward (toward the cross section). Completely covering the entire surface of the first insulation layer 112 with the second insulation layer 113 securely protects the first insulation layer 112 from being damaged during the rubbing treatment, thereby securely preventing image quality of the liquid crystal from being deteriorated.

Figure 11:
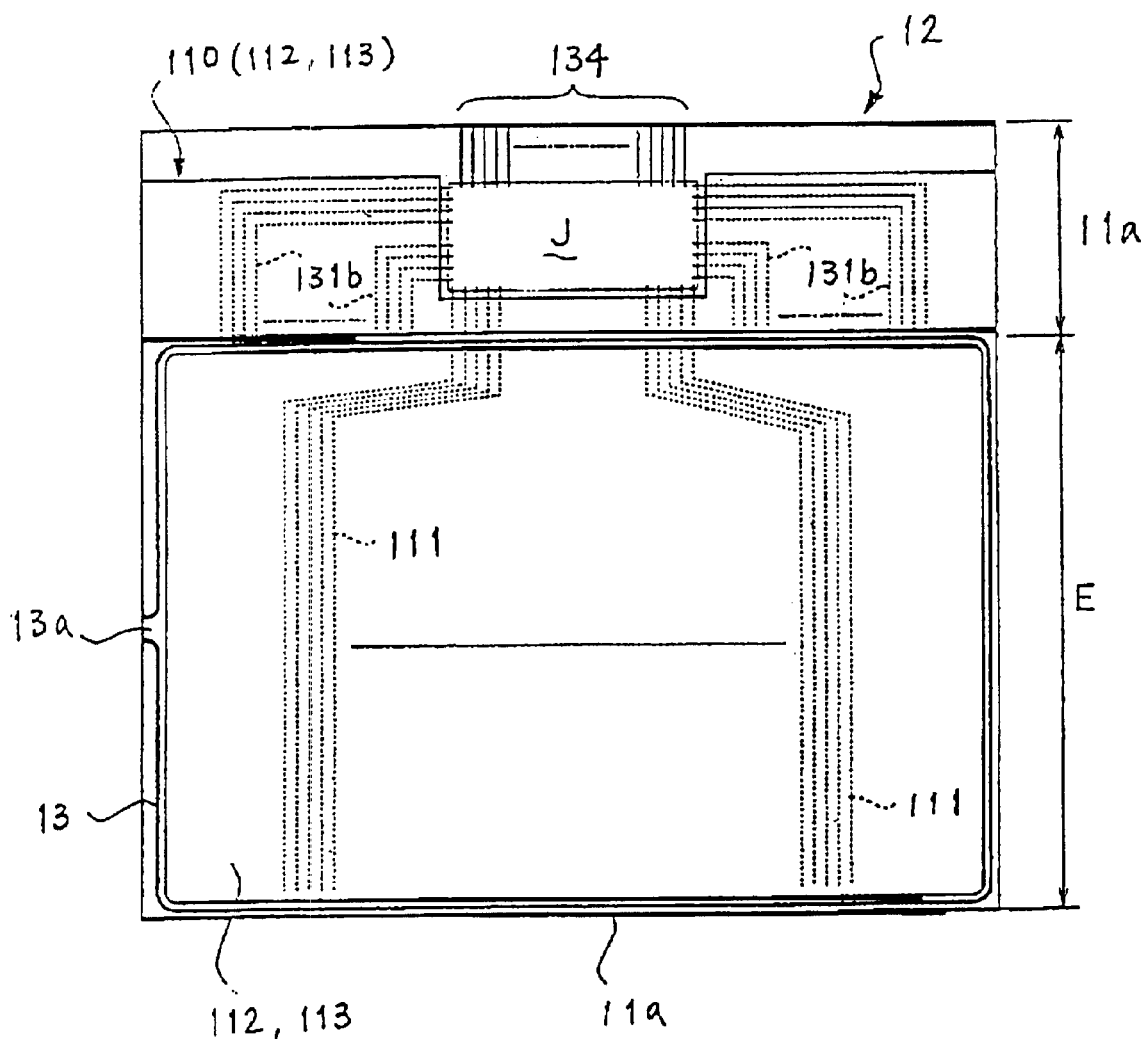
FIG. 11 is a plane view showing a seal material formed on the surface of the substrate in an intermediate product according to the second embodiment.

The seal member 13 for bonding the first substrate 11 to the second substrate 12 is formed by screen printing so as to surround the overcoat layer 112 and orientation film 113 on the first substrate 11, in addition to dividing them from the insulation layer 110 as shown in FIG. 11.

According to this embodiment as hitherto described, the insulation layer 110 is also formed on the terrace 11a of the substrate 11 by taking advantage of the insulation layers formed on the liquid crystal area E of the first substrate 11, or by taking advantage of the overcoat layer 112 and the orientation film 113. Consequently, the wiring pattern 131 located at the terrace 11a of the substrate can be more securely shielded from the outside, as compared with coating the entire area of the terrace 11a of the substrate with a molding material such as Si (silicon) after the liquid crystal panel has been formed, thereby permitting the wiring pattern 131 to be securely protected from electrolytic corrosion.

Displayed images of the liquid crystal may be also securely prevented from being deteriorated by protecting the first insulation layer 112 from being damaged during the rubbing treatment, by completely covering the entire surface of the first insulation layer 112 with the second insulation layer 113.

Figure 12:
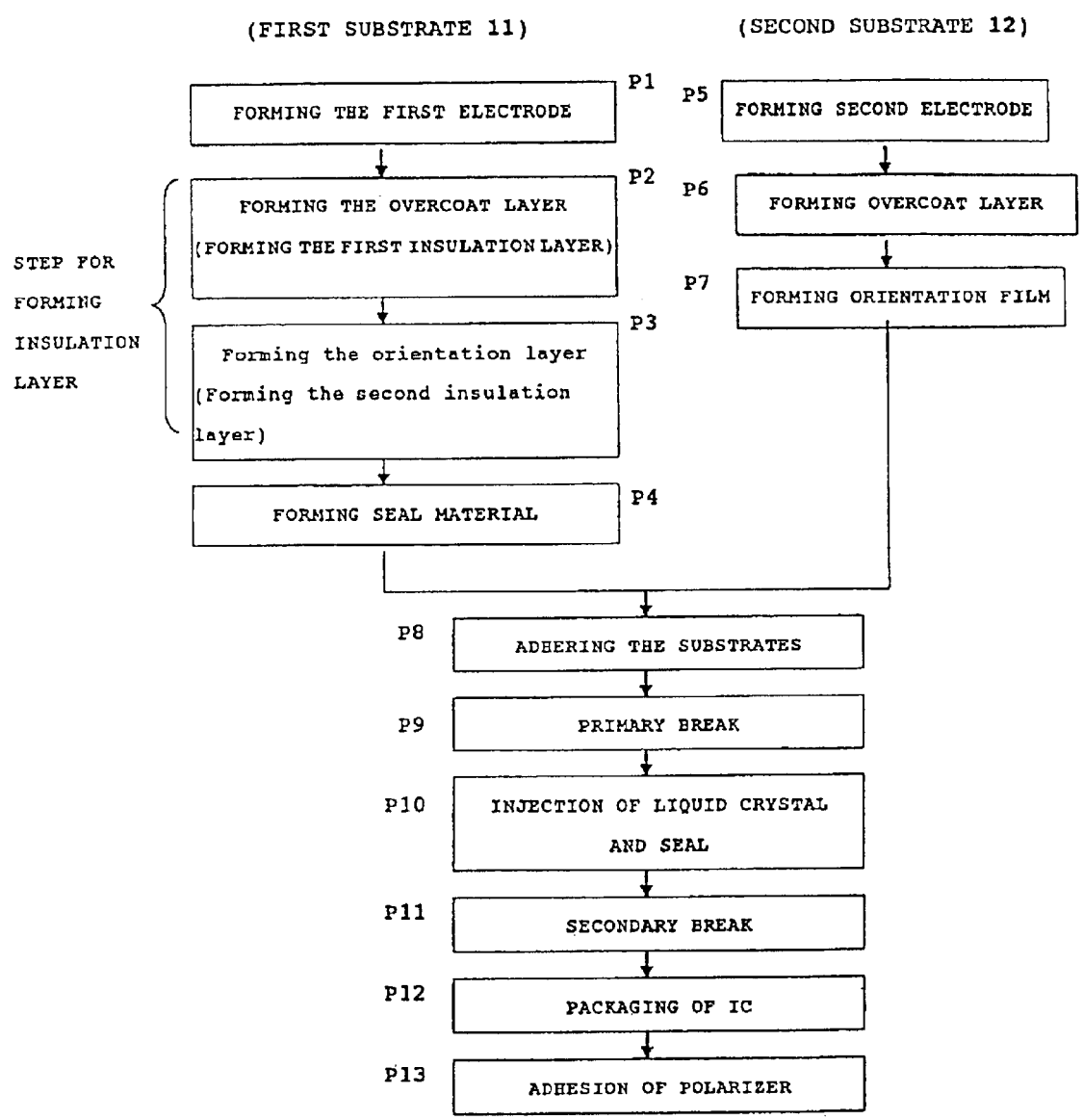
FIG. 12 is a process flow chart showing one embodiment of the method for manufacturing the liquid crystal device according to the second embodiment.

FIG. 12 shows one embodiment of the method for manufacturing the liquid crystal device 1 shown in FIG. 7. In this manufacturing method, the first substrate 11 is formed as shown in FIG. 9(a) via the steps P1 to P4. Practically, the first electrodes 111, wiring lines 131, and the input terminals 134 as a part of the wiring lines are formed on the virgin substrate 11a comprising a glass or a plastic using ITO as a starting material by a well-known patterning method such as a photolithographic method (Step P1).

Then, the overcoat layer 112 is formed by offset printing on the first electrode 111 in the liquid crystal area E as shown in FIG. 10, and the first insulation layer 112 of the insulation layer 110 is simultaneously formed on the terrace 11a leaving the input terminals 134 area and IC packaging area behind (Step P2). The orientation film 113 is further formed on the overcoat layer 112 by, for example, offset printing, and the second insulation layer 113 is simultaneously formed on the first insulation layer 112 (Step P3). The second insulation layer 113 is formed so as to completely cover the entire surface of the first insulation layer 112 including its periphery.

Then, the liquid crystal area E is formed as a division by forming the seal member 13 at the periphery of the virgin substrate 11a by screen printing as shown in FIG. 11. The reference numeral 13a denotes the liquid crystal injection port formed at a part of the seal member 13.

Meanwhile, the second electrodes 121 are formed on the virgin substrate 12a comprising a glass or a plastic by a well-known patterning method, for example the photolithographic method, using ITO as a starting material on the second substrate 12 as shown in FIG. 9(b) (Step P5 in FIG. 12), the overcoat layer 122 is formed thereon by offset printing (Step P6), and finally the orientation film 123 is formed on the overcoat layer by offset printing to form the second substrate 12.

Usually, a plurality of the first substrates 11 and the second substrates 12 are simultaneously formed as described above on separate large area mother substrates. The first substrates 11 and the second substrates 12 on these mother substrates are aligned, or positioned, and are bonded to one another (Step P8) with the seal members 13 (see FIG. 7).

Then, the liquid crystal injection port 13a (see FIG. 7) formed at a part of the seal member 13 is exposed to the outside by the primary break of the large area mother substrate (Step P9), and the liquid crystal is injected into the liquid crystal area E through the liquid crystal injection port 13a, followed by sealing the liquid crystal injection port 13a with a resin after completing injection of the liquid crystal (Step 10). A liquid crystal device 1 as shown in FIG. 7 on which the liquid crystal addressing IC 133 is not packaged is formed thereafter by secondary break (Step P11).

Then, ACF 132 (see FIG. 7) is adhered on the IC packaging area J, the liquid crystal addressing IC 133 is aligned thereon for temporary packaging, and is heat-compressed by pressing and heating to package the liquid crystal addressing IC 133 on the prescribed position on the substrate 11 (Step P12). The liquid crystal device 1 as shown in FIG. 7 is completed by adhering polarizing plates 23a and 23b on the outer surfaces of the substrates 11 and 12 (Step P13), respectively. An auxiliary wiring substrate 136 is connected to the input terminals 134 thereafter at an appropriate timing.

Figure 13:
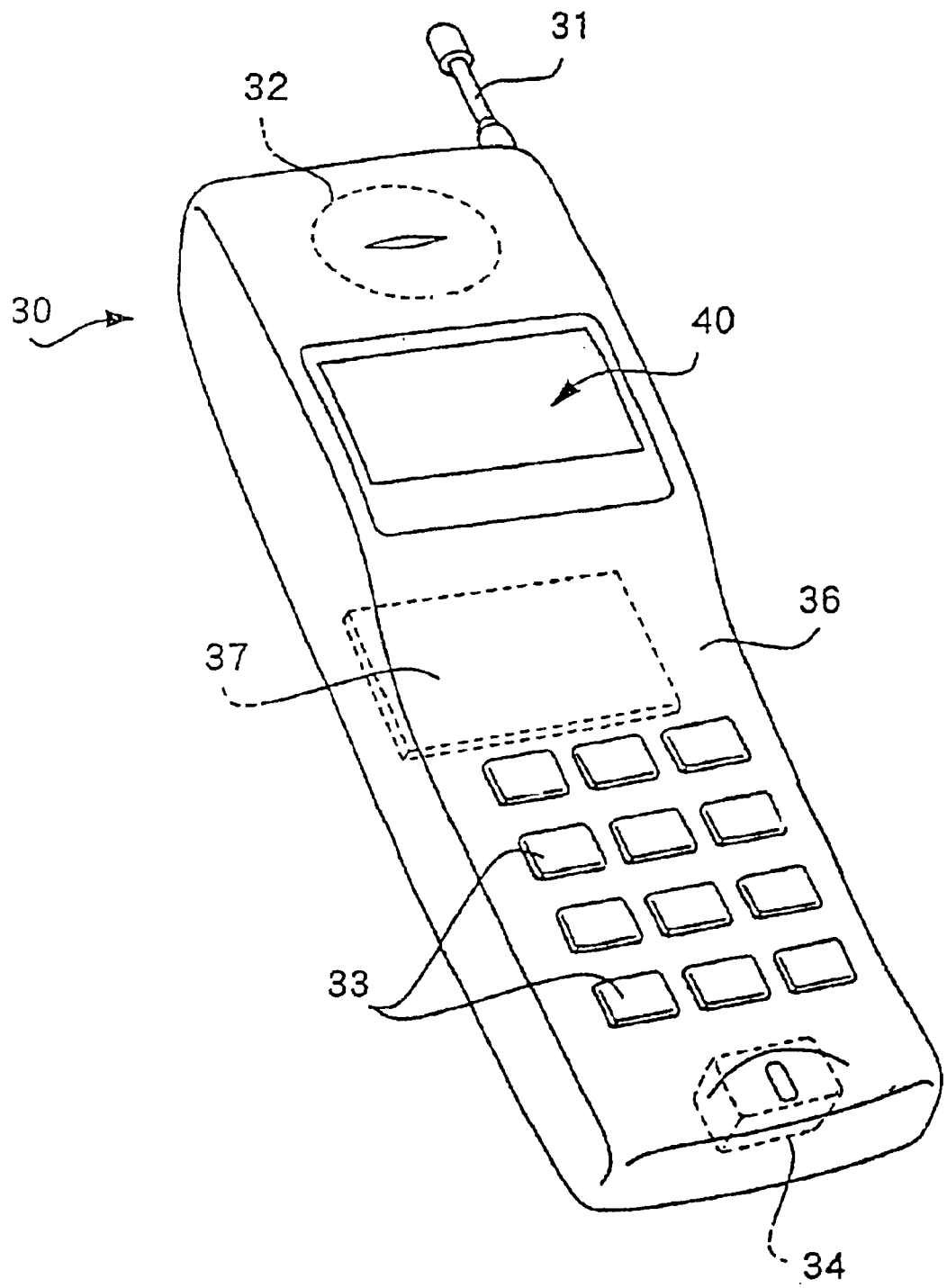
FIG. 13 is a perspective view of an electronic equipment according to the second, third and fourth embodiments.

FIG. 13 shows a portable phone as one embodiment of the present invention. The portable phone 30 shown herein comprises various constituting elements such as an antenna 31, a speaker 32, a liquid crystal device 40, key switches 33, and a microphone 34 accommodated in a package case 36 as a container. A control circuit board 37 mounting a control circuit for controlling the operation of each constituting element is provided in the package case 36. The liquid crystal device 1 as shown in FIG. 1 may be used for the liquid crystal device 40.

Input signals through the key switches 33 and the microphone 34, and received data from the antenna 31 is transferred to the control circuit on the control circuit board 37 in this portable phone 30. This control circuit then displays images such as numerals, letters and figures on the display panel of the liquid crystal device 40 based on various input data, and transmits the date out of the antenna 31.

While the present invention has been described above with respect to the preferred embodiments, the present invention is not restricted to the embodiments, but various modifications are possible within the range as set forth in the claims.

For example, although the liquid crystal device shown in FIG. 7 is a COG (Chip On Glass) type liquid crystal device, or a liquid crystal device comprising a liquid crystal addressing IC directly packaged on the substrate, the present invention is also applicable to a liquid crystal device in which the liquid crystal addressing IC is not directly packaged on the substrate. While a passive matrix liquid crystal device has been assumed in FIG. 7, an active matrix type liquid crystal device may be used in place of the passive matrix liquid crystal device.

The present invention has been applied to a liquid crystal device comprising a structure in which the liquid crystal addressing IC is packaged only on one of the substrates 11 and 12, or to a liquid crystal device comprising a structure in which the wiring pattern 131a is formed on only one substrate, in the embodiment shown in FIG. 7. However, the present invention is also applicable to a liquid crystal device having a different structure, for example to a liquid crystal device having a structure in which the liquid crystal addressing ICs are packaged on both substrates 11 and 12.

While the liquid crystal device according to the present invention is used in the portable phone as an electronic equipment in the embodiment shown in FIG. 13, the liquid crystal device according to the present invention may be used for other arbitrary electronic equipment such as a portable information terminal, an electronic pocketbook and a viewfinder of a video camera.

Figure 14:
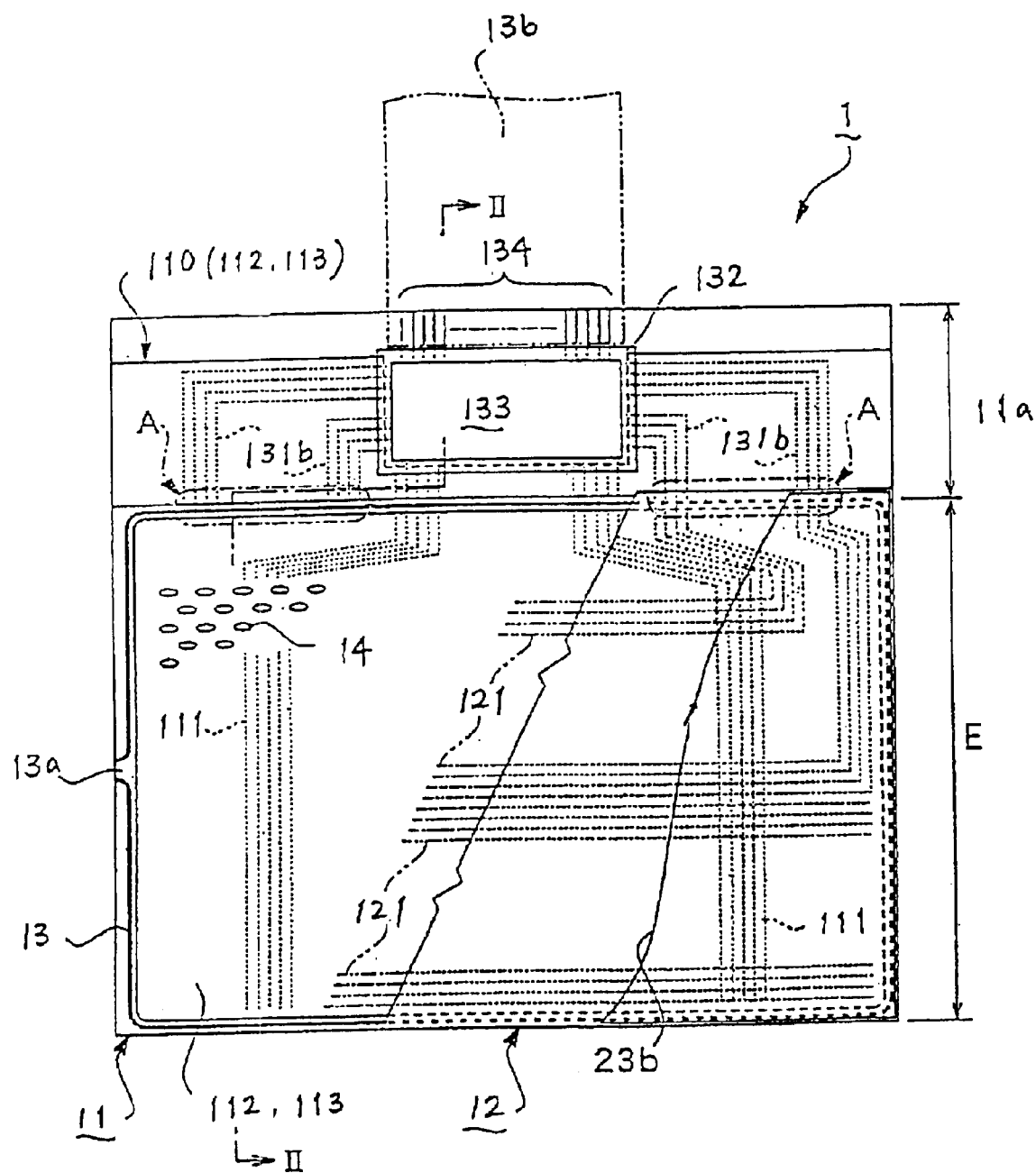
FIG. 14 shows a partially cut-away plane view of the liquid crystal device according to the third embodiment.
Figure 15:
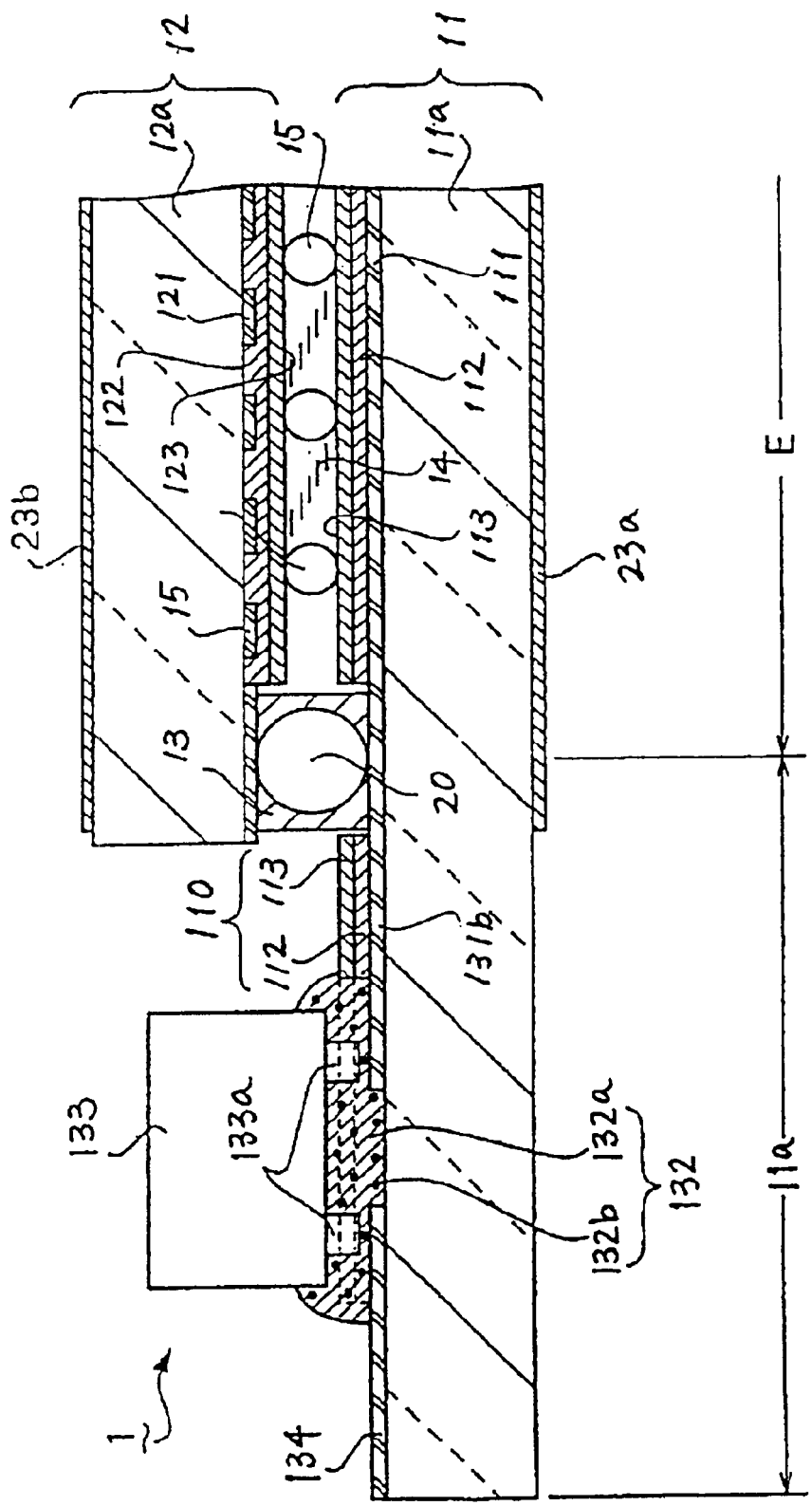
FIG. 15 shows a cross sectional side view of the cross sectional structure of the main part of the liquid crystal device along the line II—II according to the third embodiment.

FIGS. 14 and 15 show the third embodiment according to the present invention. This liquid crystal device 1 comprises a pair of substrates 11 and 12 in which their circumferences are bonded to one another with a seal member 13. This seal member 13 is formed by, for example, printing. These substrates 11 and 12 are manufactured by forming various elements on virgin substrates 11a and 12a made of a rigid material such as a glass, or a flexible film such as a plastic.

The gap formed between these substrates 11 and 12, or the so-called cell gap, is controlled to have a uniform width of, for example, about 5 μm with a plurality of spacers 15, and a liquid crystal 14 is sealed within an area surrounded by the seal member 13 in the cell-gap. The reference numeral 13a in FIG. 14 denotes a liquid crystal injection port formed at a part of the seal member 13. The liquid crystal 14 is injected into the cell-gap through the liquid crystal injection port 13a, and the liquid crystal injection port 13a is sealed with a resin after completing injection.

First electrodes 111 are formed on the surface at the liquid crystal side (the face opposing to the second substrate 12) of the first substrate 11, an overcoat layer 112 is formed thereon, and an orientation film 113 is additionally formed on the overcoat layer. Second electrodes 121 are formed on the surface at the liquid crystal side (the face opposing to the first substrate 11) of the second substrate 12 opposed to the first substrate 11, an overcoat layer 122 is formed thereon, and an orientation film 123 is additionally formed on the overcoat layer. Polarizing plates 23a and 23b are adhered on the outside surfaces of the substrates 11 and 12, respectively.

The first and second electrodes 111 and 121 are formed as transparent electrodes made of, for example, ITO (Indium Tin Oxide) with a thickness of about 500 to 1500 angstrom. The overcoat layers 112 and 122 are made of, for example, silicon oxide, titanium oxide or a mixture thereof with a thickness of about 600 angstrom. The orientation films 113 and 123 are made of, for example, a polyimide resin with a thickness of about 300 angstrom.

The first electrodes 111 are formed by aligning a plurality of linear patterns to be in parallel relation to one another, while the second electrodes 121 are formed of a plurality of linear patterns so as to construct an area perpendicular to the first electrodes 111 aligned in parallel to one another. Plural crossing points among the first electrodes 111 and the second electrodes 121 as a dot matrix constitute pixels for image display.

The first substrate 11 comprises a liquid crystal area E in which the liquid crystal 14 is sealed, and a terrace 11a expanding to the outside of the liquid crystal area E. In other words, the first substrate 11 protrudes out of the terminal face of the second substrate 12, and the first electrodes 111 on the first substrate 11 continuously extend toward the terrace 11a to form a wiring pattern. The second electrodes 121 on the second substrate 12 are made to be in electrical continuity with the electrodes on the first substrate 11 via conductive connection materials 20 (see FIG. 15) dispersed within the seal member 13, and are extended toward the terrace 11a of the substrate to form a wiring pattern.

Respective electrodes, which are formed on the terrace 11a of the first substrate 11 so as to be electrically connected to respective electrodes 111 and 121 formed on the opposed faces of both substrates, are indicated as a wiring pattern 131b. Input terminals 134 for communicating an auxiliary circuit are formed at the terminal edge of the terrace 11a of the first substrate 11.

A number of the electrodes 111 and 121, and the wiring member 131b are actually formed with a very narrow spacing on the entire surface of the substrates 11 and 12, respectively, in FIG. 14 and in the drawings to be described thereafter. However, these electrodes are illustrated with a wider spacing than the actual spacing in FIG. 14 and in the drawings thereafter for easy understanding of their structures, and a part of the electrodes are omitted in the drawings. The electrodes 111 and 121 in the liquid crystal area E are not always formed as linear patterns, but may be formed into appropriate patterns.

While the input terminals 134 are actually formed with a given narrow spacing at the terminal edge of terrace 11a of the substrate 11, they are illustrated with a wider spacing than the actual spacing in FIG. 14 for easy understanding of the structure, and a part of the terminals are omitted.

The liquid crystal addressing IC 133 is packaged by bonding with ACF (Anisotropic Conductive Film) 132 as a conductive adhesive at an appropriate site on the terrace 11a. This well-known ACF 132 is a conductive polymer film that is used for collective anisotropic electrical continuity between a pair of terminals, and is formed by allowing a lot of conductive particles 132b to disperse in a resin film 132a made of, for example, a thermoplastic or thermosetting resin. Unidirectional conductive connections between bumps 133a of the liquid crystal addressing IC 133 and the wiring pattern 131b, and between the bumps 133a and the input terminals 134 are achieved, by inserting the ACF 132 between the IC package area J of the terrace 11a of the substrate and the liquid crystal addressing IC 133 followed by heat-pressing them.

A pressurizing (compressing) tool is used for heating and compressing in the heat-compression step, and heating and pressing are simultaneously carried out by allowing the pressurizing (compressing) tool to contact the liquid crystal addressing IC 133 from the upward. A heater may be also placed under the terrace 11a of the substrate at the opposite side to the face on which the liquid crystal addressing IC is packaged.

A scanning voltage is applied for each column on either the first electrodes 111 or the second electrodes 122 from the packaged liquid crystal addressing IC 133. In addition, data voltages based on display images are applied on the other electrodes, thereby the light passing through selected pixels is modulated to display images such as letters, numerals and figures on the outside of the substrates 11 or 12.

FIG. 16(a) shows the electrodes 111, wiring pattern 131 and input terminals 134 formed on the surface of the virgin substrate 11a constituting the substrate 11. FIG. 16(b) shows the electrodes 121 formed on the surface of the virgin substrate 12a constituting the other substrate 12. The reference symbol A denotes an conductive connection part of the substrate, which allows the wiring member 131 to be electrically connected to the electrodes 121 formed on the other substrate 12a through this conductive connection part A, when the substrate 11 is bonded to the other substrate 12.

Figure 17:
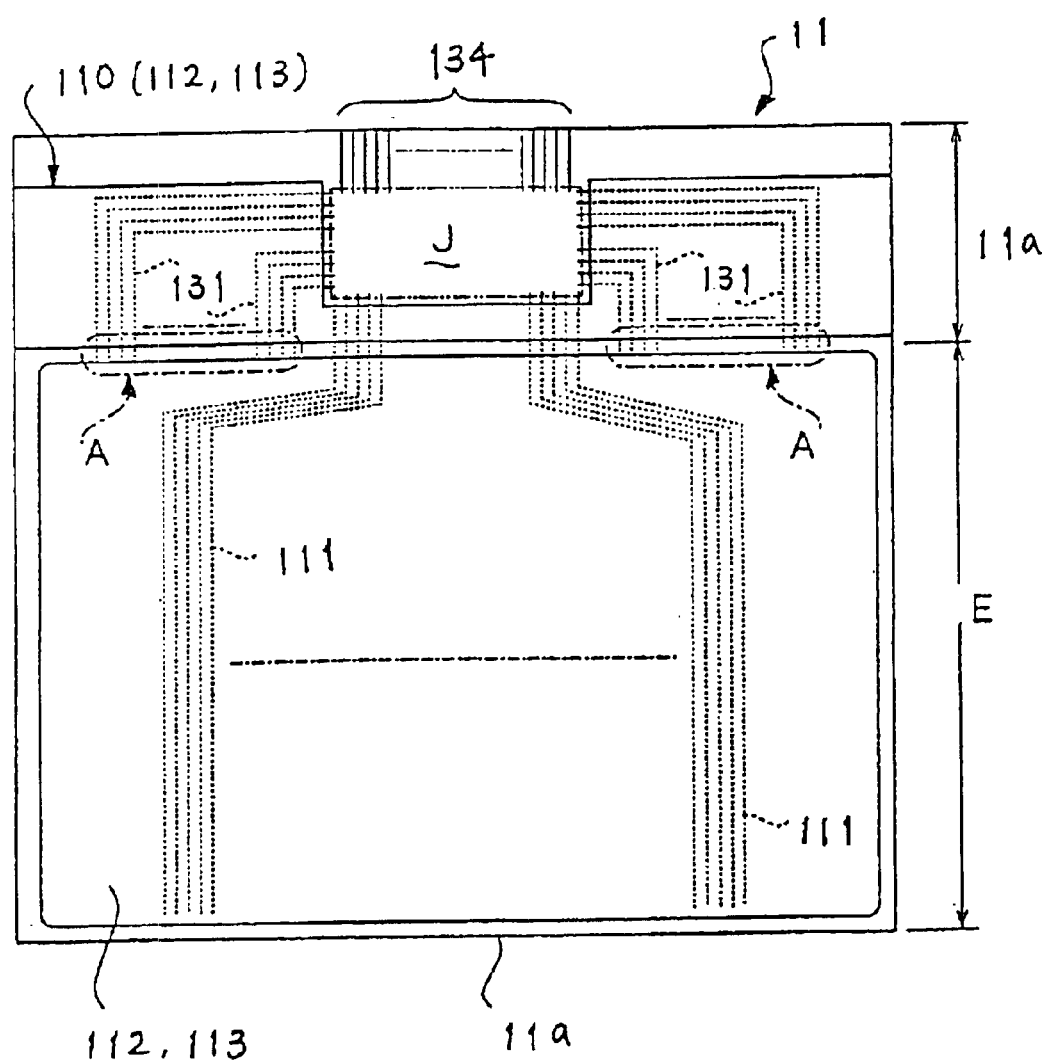
FIG. 17 is a plane view showing the insulation layer formed on the surface of the substrate in an intermediate product according to the third embodiment.

With respect to a intermediate product of the substrate 11 shown in FIG. 16, an insulation layer 110 is formed on the surface of the terrace 11a of the substrate so as to cover the entire wiring pattern 131b as shown in FIG. 17. This insulation layer 110 comprises a first insulation layer 112 simultaneously formed in forming the over coat layer 112 on the liquid crystal area E of the first substrate 11, and the second insulation layer 1113 simultaneously formed in forming the orientation film 113 on the liquid crystal area E. The wiring pattern 131 is protected from electrolytic corrosion by preventing the wiring pattern 131 on the terrace 11a of the substrate from being exposed to the outside with the insulation layer 110.

With respect to the other substrate 12, the overcoat layer 122 is formed so as to cover the electrodes 121 formed on the liquid crystal area E that is an area overlapping the substrate 11 as a counterpart.

While the overcoat layer 122, orientation film 123 and insulation layer 110 are formed over a wide area on the surface of the substrate 11, they are not formed at least on the conductive connection part A of the substrate. The seal member 13 for bonding the first substrates 11 to the second substrate 12 is formed by screen printing, so that they surrounds the overcoat layer 112 and the orientation film 113 on the first substrates 11, besides dividing these films from the insulation layer 110 on the terrace 11a of the substrate, and passing through the conductive connection part A of the substrate. Since the conductive materials 20 (see FIG. 15) are dispersed within the seal member 13, the conductive materials 20 can be disposed at the tip of the terminals at the liquid crystal area E side of the wiring member 131 by inserting the seal member 13 through the conductive connection part A.

The conductive materials 20 permit the electrodes 121 on the substrate 12 to be electrically connected to the wiring pattern 131 of the terrace 11a of the substrate 11 by being inserted between them, when the substrate 11 is bonded to the substrate 12 with the seal member 13. However, since the insulation layer 110 is not formed on the conductive connection part A of the substrate, the problem that the conductive property given by the conductive materials 20 decreases by the presence of the insulation layer 110 may be solved in this embodiment.

According to the third embodiment as hitherto described, the insulation layer 110 is also formed on the terrace 11a of the substrate 11 by taking advantage of the insulation layer formed on the liquid crystal area E on the first substrate 11, or the overcoat layer 112 and the orientation film 122. Consequently, the wiring pattern 131 formed on the terrace 11a of the substrate may be more securely shielded from the outside, as compared with molding the entire surface of the terrace 11a of the substrate with a molding material such as silicone after forming the liquid crystal panel, thereby allowing the wiring pattern 131 to be more securely protected from electrolytic corrosion.

Moreover, there is no possibility of decreasing the conductivity between the opposed electrodes by the conductive materials 20, because no insulation film 110 is formed on the conductive connection part A even when the insulation layer 110 is formed on the surface of the terrace 11a of the substrate in this embodiment.

Figure 19:
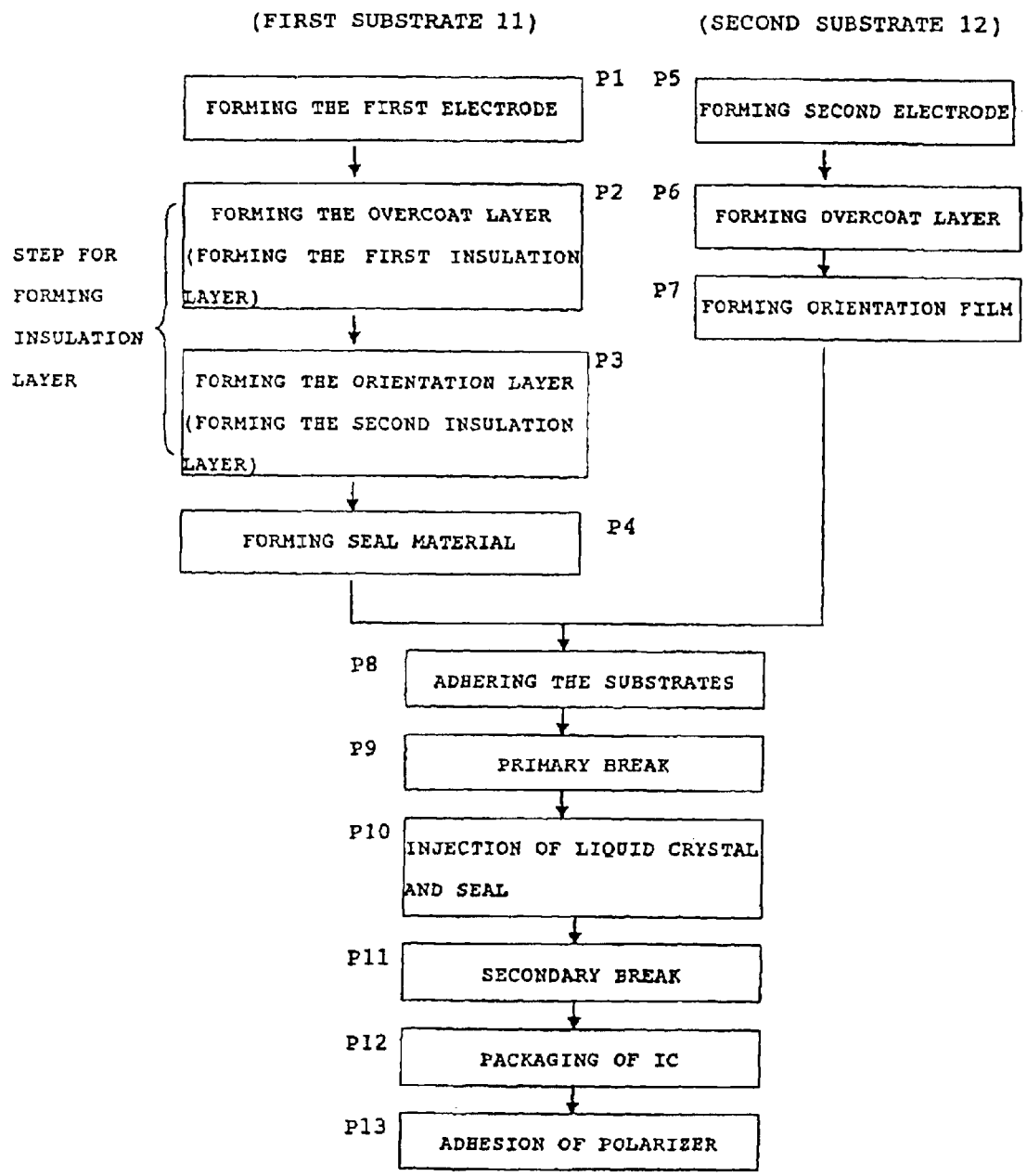
FIG. 19 is a process flow chart showing the method for manufacturing the liquid crystal device according to the third embodiment.

FIG. 19 shows one embodiment for manufacturing the liquid crystal device 1 shown in FIG. 14. The first substrate 11 as shown FIG. 16(a) is formed through the steps P1 to P4 in this manufacturing method. Practically, The first electrodes 111, the wiring pattern 131 and the input terminals 134 are formed by the patterning method known in the art, for example, a photolithographic method, using ITO as a staring material on the virgin substrate 11a comprising a glass or plastic (Step P1).

Then, the overcoat layer 112 is formed on the first electrodes 111 by offset printing on the liquid crystal area E as shown in FIG. 17, and the first insulation layer 112 of the insulation layer 110 is simultaneously formed on the terrace 11a except the input terminal 134 area, IC packaging area J and conductive connection part A (Step P2). The orientation film 113 is additionally formed on the overcoat layer 112 by offset printing, and the second insulation layer 113 is simultaneously formed on the first insulation layer 112 (Step P3). The second insulation layer 113 is also formed by excluding the input terminal 134 area, IC packaging area J and conductive connection part A, as in the step for forming the first insulation layer 112.

Figure 18:
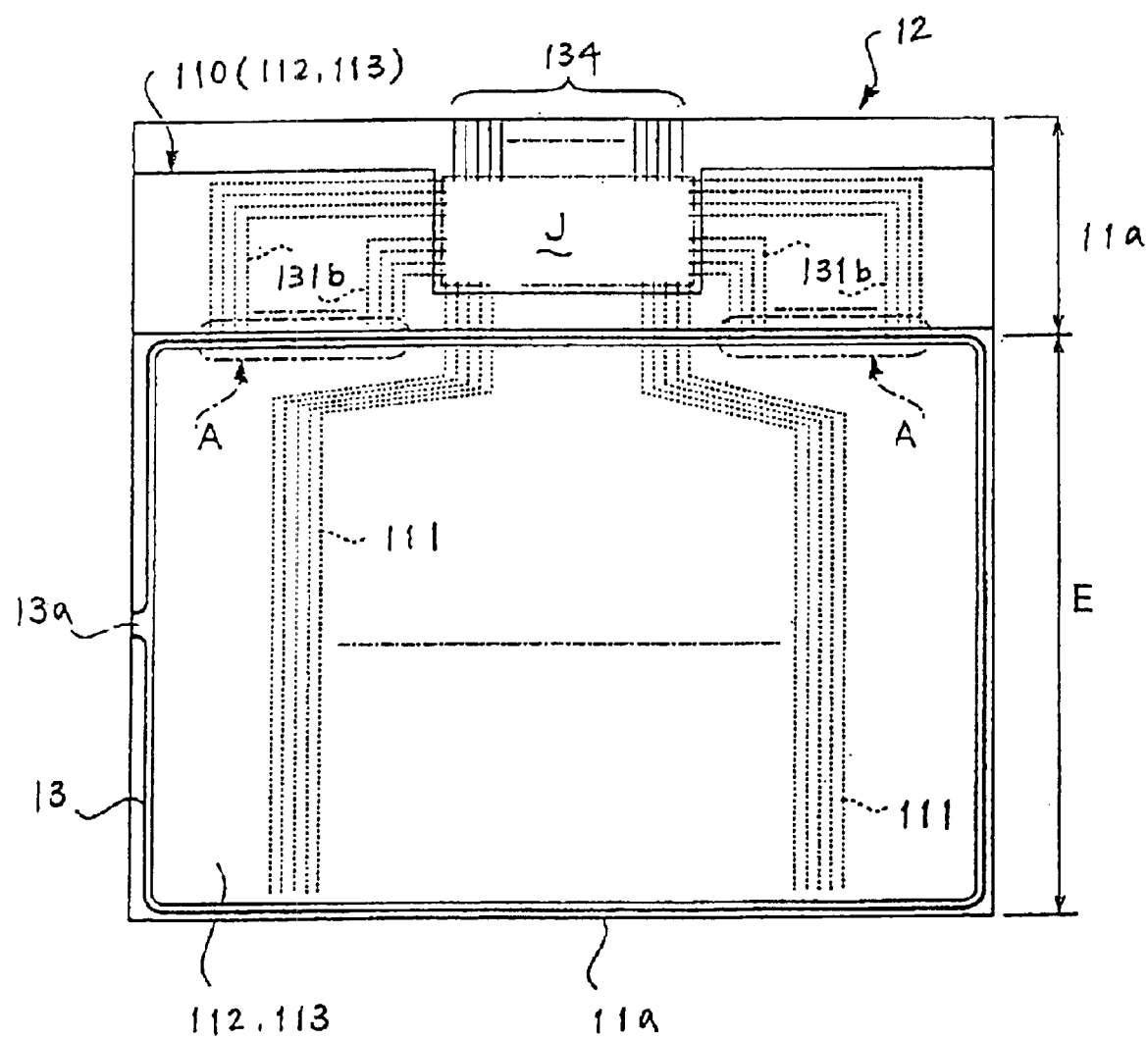
FIG. 18 is a plane view showing the seal material formed on the surface of the substrate in an intermediate product according to the third embodiment.

Then, the seal member 13 comprising the liquid crystal injection port 13a is formed at the circumference of the virgin substrate 11a by, for example, screen printing to divide the liquid crystal area E as shown in FIG. 18. The conductive materials 20 dispersed within the seal member 13 is disposed on the electrode within the conductive connection part A of the substrate.

With respect to the second substrate 12, on the other hand, the second electrodes 121 are formed by, for example, the photolithographic method on the virgin substrate 12a comprising a glass or plastic using ITO as a starting material as shown in FIG. 16(b) (Step P5 in FIG. 19). Subsequently, the overcoat layer 122 is formed on the second electrodes by, for example, offset printing (Step P6), followed by forming the orientation film 123 on the overcoat layer by offset printing, thereby completing the second substrate 12.

Usually, the first substrate 11 and the second substrate 12 formed as described above are simultaneously formed on separate large area mother substrates (so-called mother glass substrates) as a plurality of respective substrates. The first substrates 11 and the second substrates 12 on these mother substrates are aligned, or positioned, and bonded to one another (Step P8) with the seal members 13 (see FIG. 14).

Then, the liquid crystal injection port 13a (see FIG. 14) formed at a part of the seal member 13 is exposed to the outside by the primary break of the large area mother substrate (Step P9), and the liquid crystal is injected into the liquid crystal area E through the liquid crystal injection port 13a, followed by sealing the liquid crystal injection port 13a with a resin after completing injection of the liquid crystal (Step 10). A liquid crystal device 1 as shown in FIG. 7 on which the liquid crystal addressing IC 133 is not packaged is formed thereafter by secondary break (Step P11).

Then, the ACF 132 is adhered on the IC packaging area J (see FIG. 1), and the liquid crystal addressing IC 133 is temporarily packaged for alignment thereon, followed by heat-compression by heating and pressing, thereby packaging the liquid crystal addressing IC 133 on the prescribed site on the substrate 11 (Step P12). Then, the polarizing plates 23a and 23b are adhered on the outer surface of the substrates 11 and 12 (Step P13), respectively, to complete the liquid crystal device 1 shown in FIG. 14. An auxiliary circuit board 136 is connected to the input terminals 134 at an appropriate timing thereafter.

FIG. 13 shows a portable phone as one embodiment of the electronic equipment according to the present invention. Since the main components of the electronic equipment in this embodiment is the same as those of the electronic equipment in the second embodiment, the same drawing as used in the second embodiment is also used in this embodiment. The portable phone 30 shown herein comprises various constituting elements such as an antenna 31, a speaker 32, a liquid crystal device 40, key switches 33, and a microphone 34 accommodated in a package case 36 as a container. A control circuit board 37 mounting a control circuit for controlling the operation of each constituting element is provided in the package case 36. The liquid crystal device 1 as shown in FIG. 1 may be used for the liquid crystal device 40.

Input signals through the key switches 33 and the microphone 34, and received data from the antenna 31 is transferred to the control circuit on the control circuit board 37 in this portable phone 30. This control circuit then displays images such as numerals, letters and figures on the display panel of the liquid crystal device 40 based on various input data, and transmits the data out of the antenna 31.

While the present invention has been described with reference to the preferable embodiments, the present invention is not restricted to these embodiments, but various modifications are possible within the scope of the present invention.

For example, although the liquid crystal device shown in FIG. 14 corresponds to a COG (Chip On Glass) type liquid crystal device, or to a liquid crystal device comprising a liquid crystal addressing IC directly packaged on the substrate, the present invention is applicable to a liquid crystal device in which the liquid crystal addressing IC is not directly packaged on the substrate. While a passive matrix type liquid crystal device has been assumed in FIG. 1, an active matrix type liquid crystal device may be used in place of the passive matrix type liquid crystal device.

While the liquid crystal addressing IC has been packaged on either the substrate 11 or the substrate 12, or the wiring pattern 131 has been formed only on one of the substrate, in the embodiment shown in FIG. 1, the present invention is applicable to liquid crystal devices having structures other than the structure as described above, for example a liquid crystal device having liquid crystal addressing ICs packaged on both substrates 11 and 12.

While the liquid crystal device according to the present invention was used for a portable telephone as one of the electronic equipments in the embodiment shown in FIG. 13, the liquid crystal device may be also applied for other arbitrary electronic equipments, for example a portable information terminal device, an electronic pocketbook and a viewfinder of a video-camera.

Figure 20:
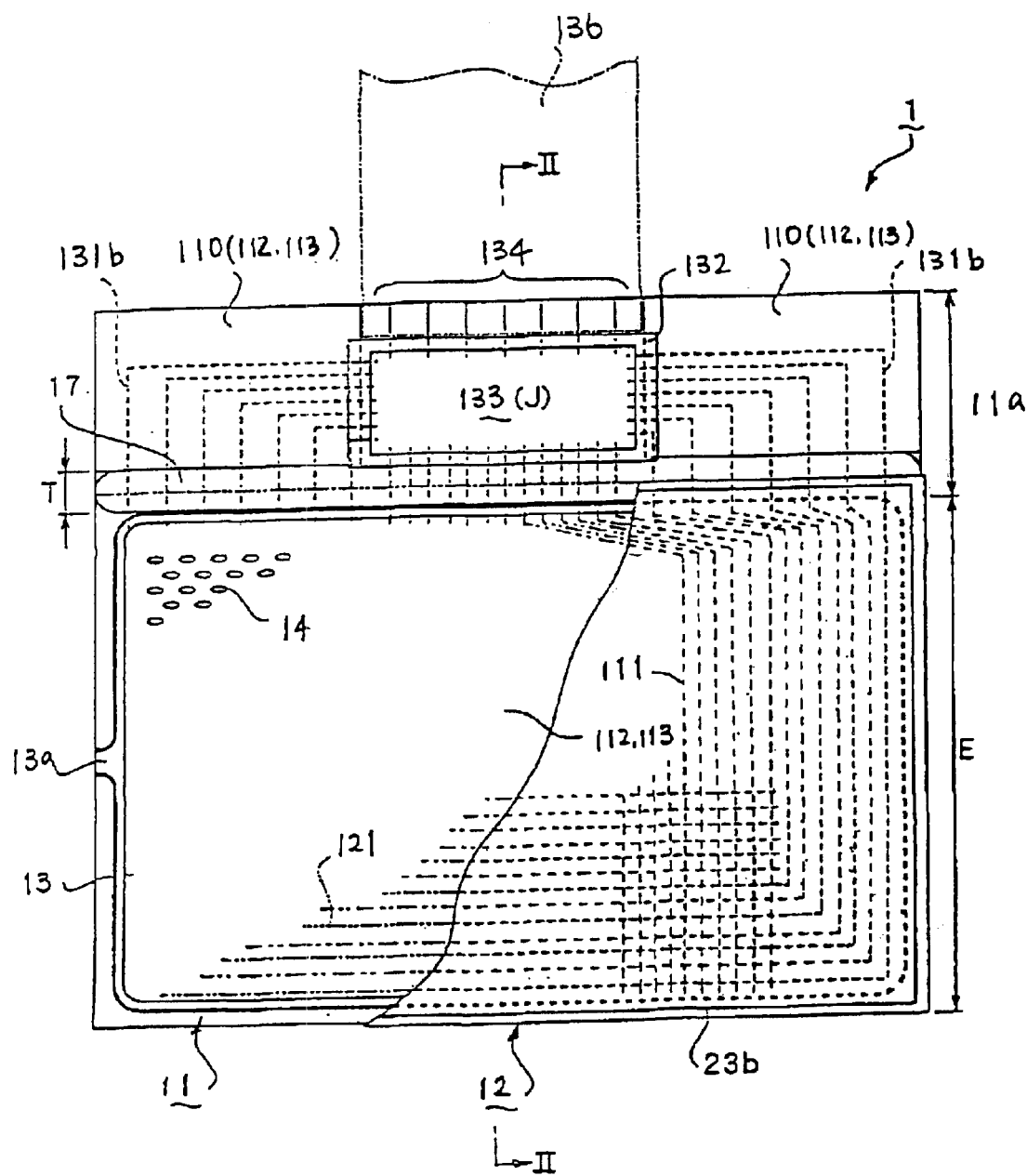
FIG. 20 is a partially cut-away plane view of the liquid crystal device according to the fourth embodiment.
Figure 21:
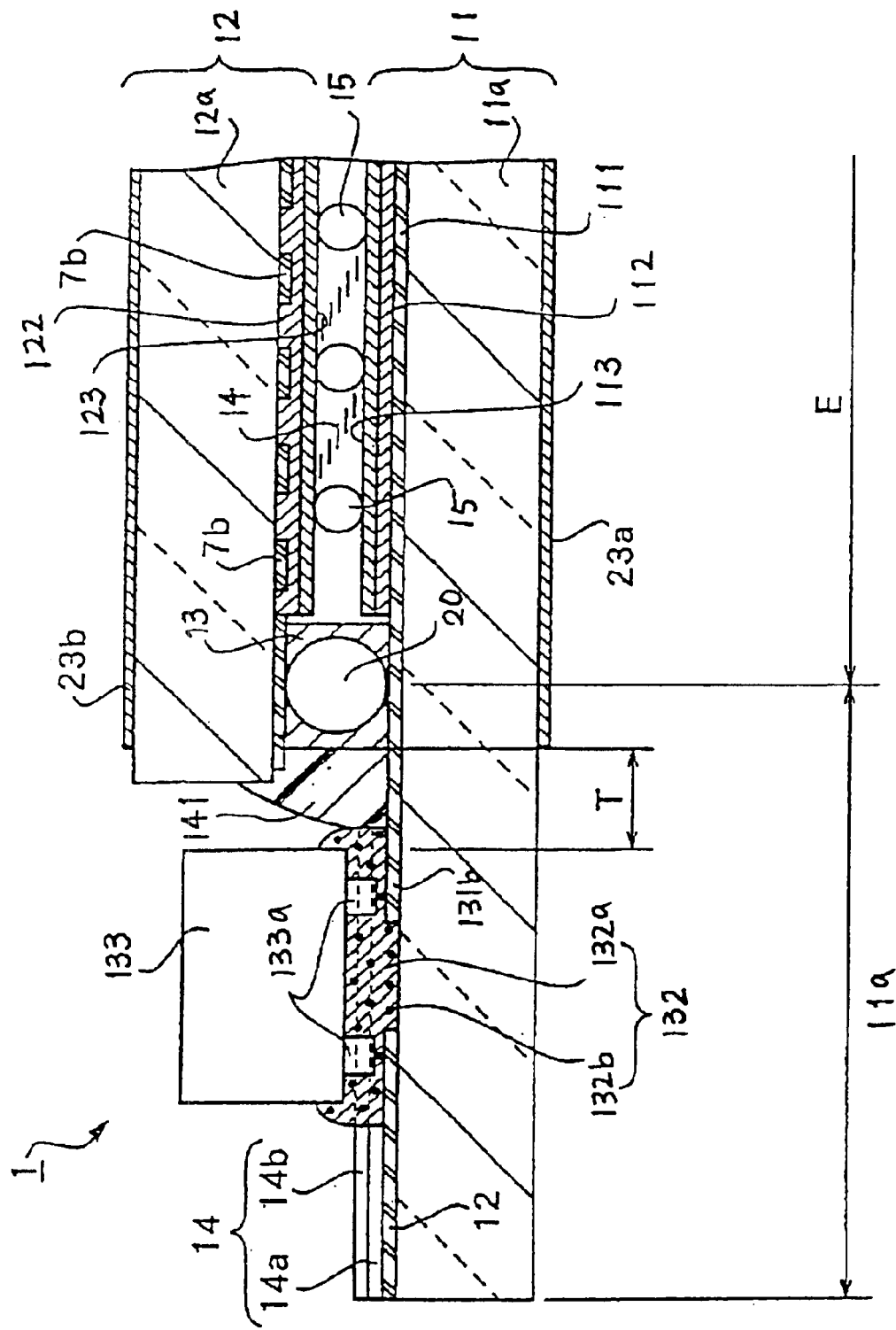
FIG. 21 is a cross sectional side view showing the cross sectional structure of the main part of the liquid crystal device along the line II—II according to the fourth embodiment.

FIGS. 20 and 21 show a liquid crystal device according to the fourth embodiment of the present invention. This liquid crystal device 1 comprises a pair of substrates 11 and 12 in which their circumferences are bonded to one another with a seal member 13. The seal member 13 is formed by printing. The substrates 11 and 12 comprises various elements formed on virgin substrates 11a and 12a made of a rigid transparent material such as a glass or a flexible transparent material such as a plastic.

The space formed between the substrates 11 and 12, a so-called cell gap, is controlled to have a uniform width of, for example, about 5 μm with a plurality of spacers 15, and a liquid crystal 14 is injected and sealed in the area surrounded by the seal member 13 in the cell-gap.

First electrodes 111 are formed on the surface of the liquid crystal side of the first substrate 11, an overcoat layer 112 is formed thereon, and an orientation film 113 is additionally formed on the overcoat layer. Second electrodes 121 are formed on the surface of the liquid crystal side of the second substrate 12 opposed to the first substrate 11, an overcoat layer 122 is formed thereon, and an orientation film 123 is additionally formed on the overcoat layer. Polarizing plates 23a and 23b are adhered on the outside surface of the substrates 11 and 12, respectively.

The first and second electrodes 111 and 121 are formed to have a thickness of about 500 to 1500 angstrom with ITO (Indium Tin Oxide), the overcoat layers 112 and 122 are formed to have a thickness of about 600 angstrom with silicon oxide, titanium oxide or a mixture thereof, and the orientation film 113 is formed to have a thickness of about 300 angstrom with a polyimide resin.

The first electrodes 111 are formed by aligning a plurality of linear patterns in parallel to one another, and the second electrodes 121 are formed by aligning a plurality of linear patterns in parallel to one another and perpendicular to the first electrodes 111. Pixels for image display are formed at plural crossing points where these electrodes 111 and 121 cross to one another and form a dot matrix.

The first substrate 11 comprises a liquid crystal area E in which the liquid crystal 14 is sealed, and a terrace 11a expanding out of the liquid crystal area E. The first electrodes 111 on the first substrate 11 is directly extended toward the terrace 11a to form a wiring pattern. The second electrodes 121 on the second substrate 12 is put into conductive connection with the electrodes on the first substrate 11 via the conductive material 20 (FIG. 21) dispersed inside the seal member 13, and is extended toward the terrace 11a to form a wiring pattern. Respective electrodes formed into wiring patterns by being put into conductive connection from both substrates to the terrace 11a of the first substrate 11 are shown as extension electrodes 131 in this embodiment. Output terminals 134 for electrically connecting to an auxiliary circuit is formed at the terminal edge of the terrace 11a of the first substrate 11. FIG. 21 shows a cross section along the line II—II in FIG. 20. An insulation layer 110 drawn on the input terminals 134 in FIG. 21 denotes an insulation layer formed at the back of the area where the input terminals 134 are formed, and the insulation layer 110 is not formed on the input terminals 134.

In FIG. 20 and in the drawings to be described hereinafter, a number of the electrodes 111 and 121, and the wiring lines 131 are actually formed on the entire surfaces of the substrates 11 and 12 with a narrow spacing. However, these electrodes are illustrated in FIG. 20 with a wider spacing than the actual spacing for easy understanding of the structure, and a part of the electrodes are omitted in the drawing. The electrodes 111 and 121 are not always formed as linear lines, but they may be formed into appropriate patterns. While the input terminals 134 are actually formed at the terminal edge of the terrace 11a of the substrate 11 with a prescribed narrow spacing, they are illustrated with a wider spacing than the actual spacing in FIG. 20 for easy understanding of the structure, and a part of the terminals are omitted in the drawing.

The terrace 11a of the substrate 11 comprises a turn-on inspection area T as an area for allowing an electrical continuity inspection apparatus such as a probe to contact for the turn-on inspection, a IC packaging area J for adhering, or packaging, the liquid crystal addressing IC 133, and an input terminal area N for connecting the auxiliary circuit board 136. The turn-on inspection area T on the terrace 11a is provided at a site adjoining to a step formed between the terrace and the second substrate 12 by protruding the first substrate 11, or at the site between the seal member and the IC packaging area. The insulation layer 110 is formed on the area except the turn-on inspection area T, IC packaging area J and the input terminal area N on the terrace 11a.

The insulation layer 110 comprises a first layer 112 simultaneously formed in forming the overcoat layer 112 on the liquid crystal area E, and a second layer 113 simultaneously formed in forming the orientation film 113 on the liquid crystal area E, of the first substrate 11. The insulation layer 110 permits the wiring patterns 131 on the terrace 11a to be protected from being exposed to the outside, thereby preventing the extension electrodes 131 from electrolytic corrosion.

The turn-on inspection area T serves as an area for inspecting the display quality of the liquid crystal device by tentatively turning the pixels within the liquid crystal area E on. When the liquid crystal device has been decided to pass the turn-on test after finishing the turn-on inspection, the liquid crystal addressing IC is heat-compressed onto the terrace 11a of the substrate.

The heat-compression step of the liquid crystal addressing IC 133 comprises adhering, or packaging, the liquid crystal addressing IC 133 on the terrace 11a of the substrate with an ACF (Anisotropic Conductive Film) as a conductive adhesive. The well known ACF is a conductive polymer film used for collective conductive connection between a pair of terminals, and is manufactured by allowing a number of conductive particles 132b to disperse in a thermoplastic or thermosetting resin film 132a. A unidirectional conductive connection is achieved between bumps 133a of the liquid crystal addressing IC 133 and the wiring pattern 131, and the bumps 133a and the input terminals 134, by inserting the ACF 132 between the IC packaging area J on the terrace 11a of the substrate and the liquid crystal addressing IC 133, followed by heat-compressing them together. A pressurizing (compressing) tool (not shown) is used for heating and pressing in the heat-compression step, and heating and pressing is simultaneously carried out by allowing the pressurizing (compressing) tool to contact the liquid crystal addressing IC 133 from the upward. A heater may be also placed under the terrace 11a of the substrate at the opposite side to the face on which the liquid crystal addressing IC is packaged.

A scanning voltage is applied for each column on either the first electrodes 111 or the second electrodes 122 with the packaged liquid crystal addressing IC 133. In addition, data voltages based on display images are applied on the other electrodes, thereby the light passing through selected pixels is modulated to display images such as letters, numerals and figures on the outside of the substrates 11 or 12.

After heat-compression of the liquid crystal addressing IC 133, a molding step is applied to the turn-on inspection area T. A moisture-proof molding material 141 such as an insulation silicone is applied by coating on the turn-on inspection area T. This molding material 141 also permits the wiring pattern 131 to be protected from being exposed to the outside, thereby preventing the extension electrodes 131 from electrolytic corrosion.

The wiring pattern 131 of the turn-on inspection area T, as well as the electrodes 121, can be simultaneously coated by applying the molding material 141 on the turn-on inspection area T, wherein the electrodes 121 is exposed to the open air as a result of penetration of the substrate 12 through the seal member 13 due to the errors in the molding accuracy of the seal member 13 and assembling accuracy of the substrates 11 and 12.

The entire wiring pattern 131 and input terminals 134 formed on the terrace 11a of the substrate are protected from being exposed to the outside, by applying the molding material 141 on the turn-on inspection area T in addition to electrically connecting the auxiliary wiring board 136 to the input terminal area N with the ACF or a heat seal, thereby the wiring pattern 131 can be securely prevented from electrolytic corrosion.

According to the embodiment as hitherto described, the insulation layer 110 is also formed on the terrace 11a of the substrate 11 by taking advantage of the insulation layer formed on the liquid crystal area E of the first substrate 11, or by taking advantage of the overcoat layer 112 and the orientation film 113. Consequently, the liquid crystal device may be efficiently manufactured since there is no need of waiting a large amount of the molding material covering the entire area of the terrace 11a of the substrate to cure for a long period of time, as compared with the case when the entire area of the terrace 11a of the substrate is covered with a molding material such as silicone after forming the conventional liquid crystal panel. Moreover, the wiring pattern 131 located on the terrace 11a of the substrate may be more securely protected from electrolytic corrosion.

In addition, since the insulation layer 110 is formed on the area except the turn-on inspection area T in forming the insulation layer 110 on the terrace 11a of the substrate, the turn-on inspection after forming the insulation layer 110 may be carried out without any hindrance by taking advantage of the wiring pattern 131 exposed to the outside on the turn-on inspection area T.

Figure 22:
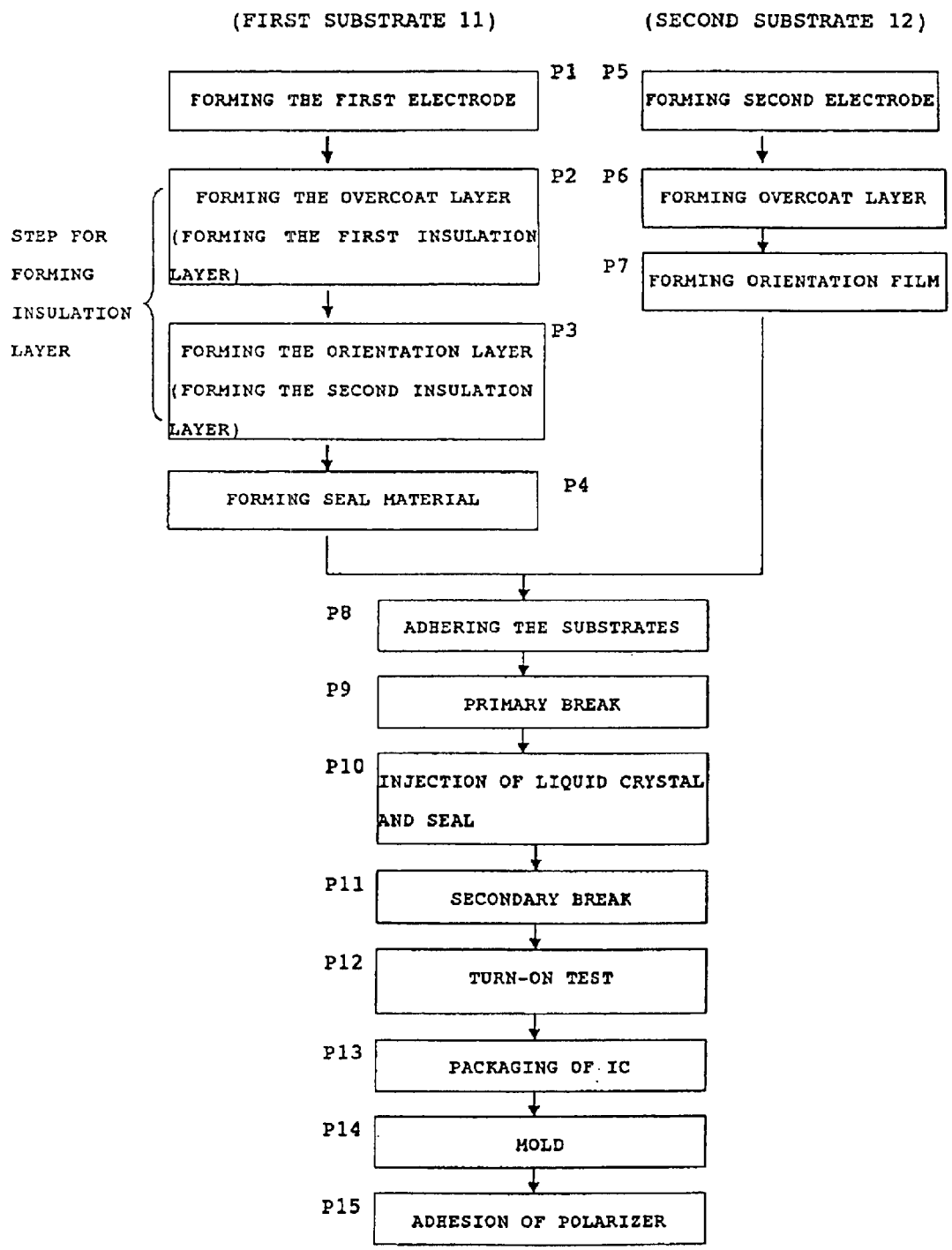
FIG. 22 is a process flow chart showing the method for manufacturing the liquid crystal device according to the fourth embodiment.
Figure 23:
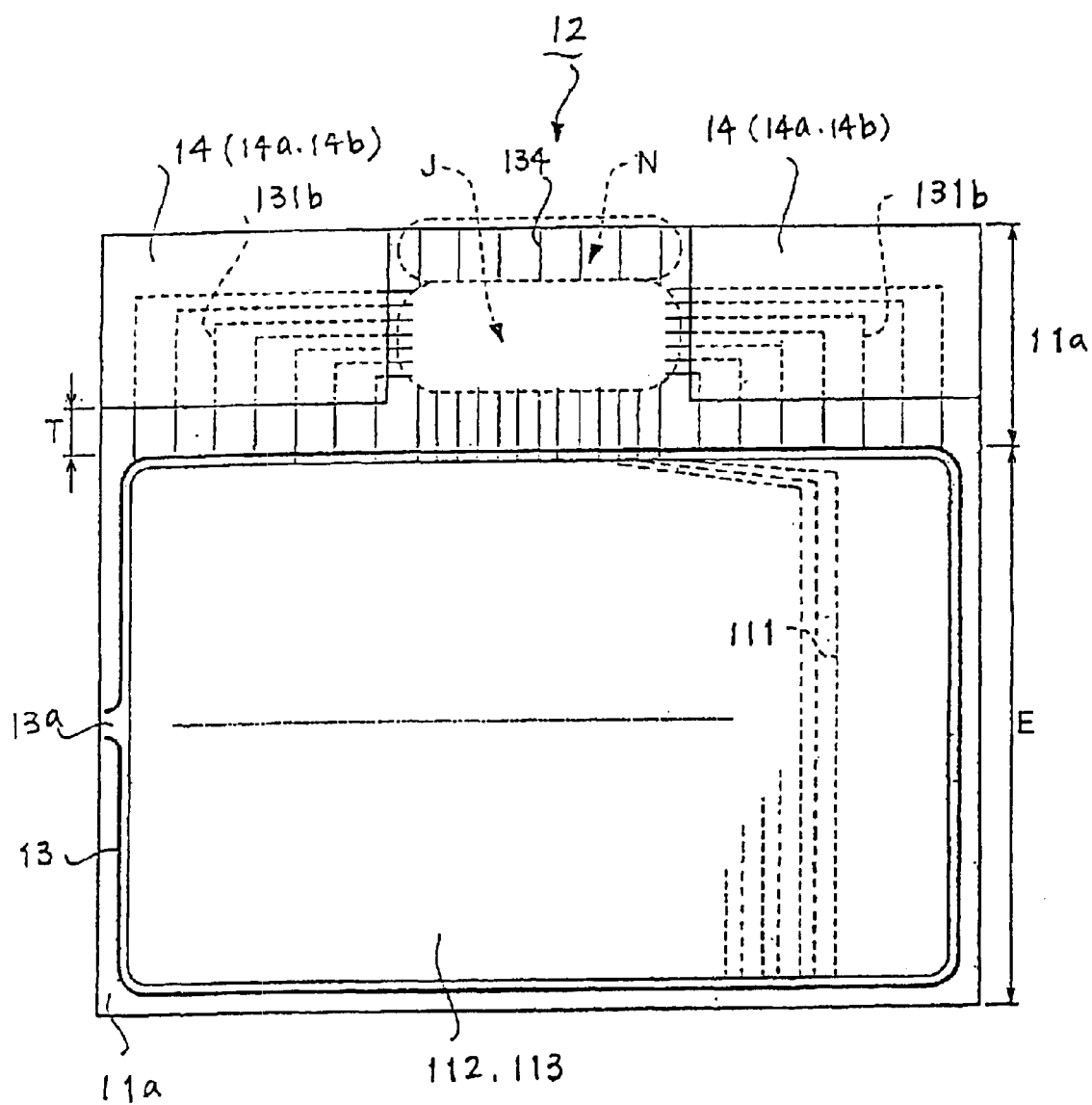
FIG. 23 is a plane view showing one of the substrates constituting the liquid crystal device according to the fourth embodiment.

FIG. 22 shows one embodiment for manufacturing the liquid crystal device 1 shown in FIG. 20. In this manufacturing method, the first substrate 11 is manufactured through the steps P1 to P4 as shown in FIG. 23. Actually, the first electrodes 111 and the wiring pattern 131 are formed on a virgin substrate 11a comprising a glass or a plastic by a well-known patterning method, for example by a photolithographic method, using ITO as a starting material (Step P1).

The overcoat layer 112 is formed on the first electrodes 111 on the liquid crystal area E by, for example, offset printing, and the first layer 112 of the insulation layer 110 is simultaneously formed on the terrace 11a except the turn-on inspection area T, the IC package area J and the input terminal area N (Step P2). Then, the orientation film 113 is formed on the overcoat layer 112 by offset printing, and the second layer 113 is simultaneously formed on the first layer 112 of the insulation layer (Step P3). Subsequently, the seal member 13 is formed at the periphery of the virgin substrate 11a by screen printing to divide the liquid crystal seal area E. The reference numeral 13a denotes a liquid crystal injection port formed at a part of the seal member 13.

With respect to the second substrate 12, on the other hand, the second electrodes 121 are formed by a well-known patterning method, for example by the photolithographic method, on the virgin substrate 12a (see FIG. 21) comprising a glass or a plastic using ITO as a starting material (Step P5 in FIG. 22). Then, the overcoat layer 122 is formed thereon by offset printing (Step P6), and the orientation film 123 is formed on the overcoat layer by offset printing, thereby completing the second substrate 12.

Usually, the first substrate 11 and the second substrate formed 12 formed as described above are simultaneously formed on separate large area mother substrates (so-called mother glass substrates) as a plurality of respective substrates. The first substrates 11 and the second substrates 12 on these mother substrates are aligned, or positioned, and bonded to one another (Step P8) with the seal members 13 (see FIG. 20).

Figure 24:
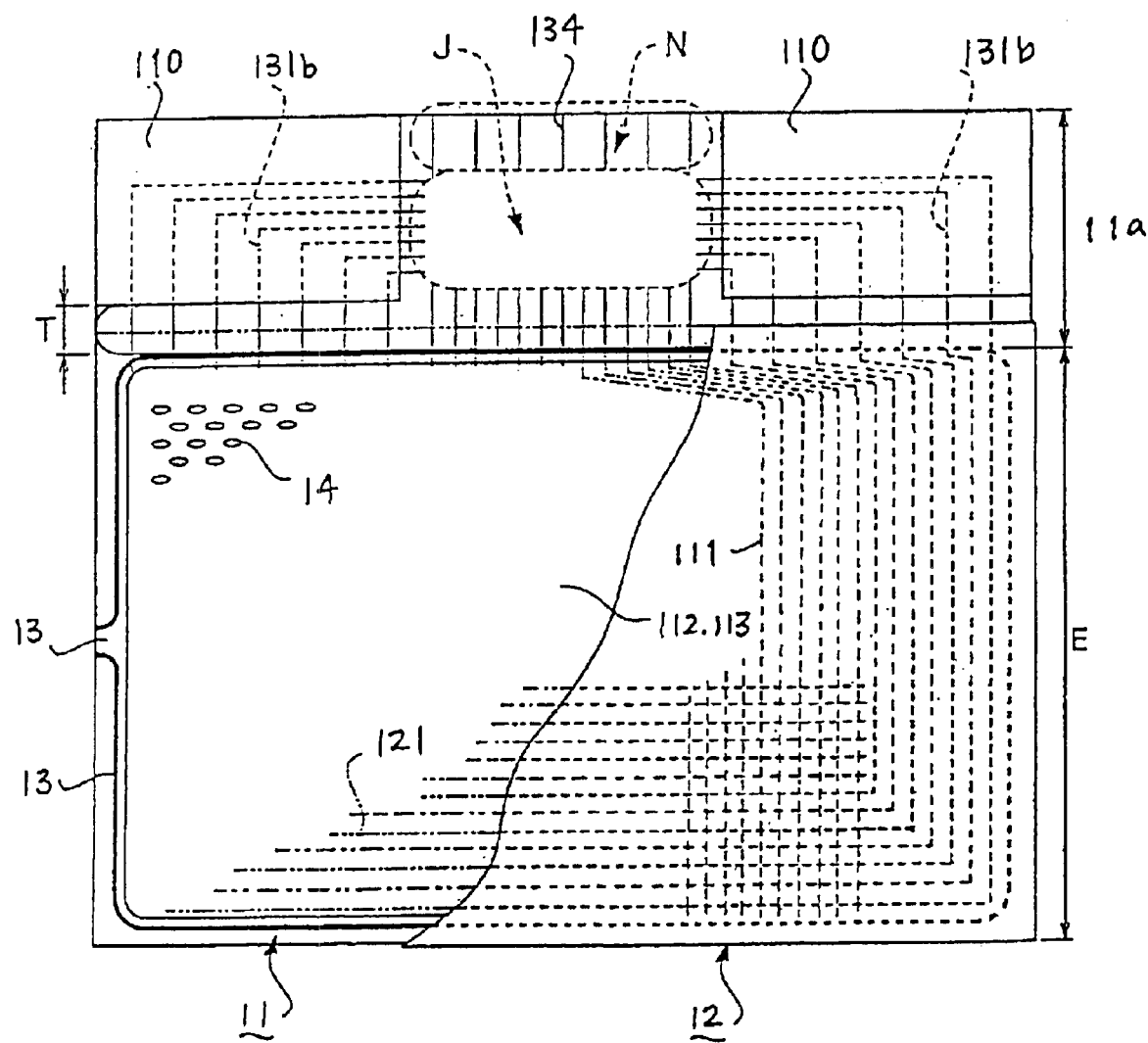
FIG. 24 is a plane view showing the liquid crystal device before packaging a liquid crystal addressing IC according to the fourth embodiment.

Then, the liquid crystal injection port 13a (see FIG. 20) formed at a part of the seal member 13 is exposed to the outside by the primary break of the large area mother substrate (Step P9), and the liquid crystal is injected into the liquid crystal area E through the liquid crystal injection port 13a, followed by sealing the liquid crystal injection port 13a with a resin after completing injection of the liquid crystal (Step 10). A liquid crystal panel corresponding to one liquid crystal device 1 as shown in FIG. 24, on which the turn-on inspection area T, the IC package area J and the input terminal area N are open to the outside without being covered with the insulation layer, is formed by the secondary break (Step P11).

Subsequently, a prove of an inspection apparatus is made to contact the wiring pattern 131 exposed to the outside at the turn-on inspection area T, and a given magnitude of an addressing electric current is applied to each electrode through the prove to tentatively turn each pixel within the liquid crystal area E on for inspecting the quality of the pixels (Step P12). When the inspection results are normal, then the ACF 132 (see FIG. 20) is adhered on the IC packaging area J (see FIG. 20), and the liquid crystal addressing IC 133 is temporarily packaged with alignment followed by heat-compressing by pressing and heating, thereby the liquid crystal addressing IC 133 is packaged on the prescribed site on the substrate 11 (Step P13).

Subsequently, the molding material 141 such as Si is adhered by coating on the turn-on inspection area T after inspection (Step P14). Polarizing plates 23a and 23b are additionally adhered on the outside surface of the substrate 11 and 12 (Step P15), respectively, thereby completing the liquid crystal device 1 shown in FIG. 20. Although the input terminal area N is open to the outside yet, it can be also shielded from the outside atmosphere by electrically connecting an auxiliary wiring board 136 to the input terminals 132 at an appropriate timing thereafter.

The entire area of the wiring pattern 131 on the terrace 11a of the substrate 11 is shielded from the outside atmosphere by the procedure described above, and consequently the extension electrodes 131 is securely protected from electrolytic corrosion. According to this embodiment, in particular, since the layer formed by the molding treatment, which has slightly lower moisture-proof property as compared with the layers such as the insulation layer 110 formed by deposition methods including the photolithographic method, is applied on a very limited area, the function for preventing electrolytic corrosion may be maintained for a long period of time at a high level.

FIG. 13 shows a portable phone as one embodiment of the electronic equipments according to the present invention. The same drawings as used in the second embodiment are also used in this embodiment, since the same main components in this embodiment are common to those used in the second embodiment. The portable phone 30 shown herein comprises various constituting elements such as an antenna 31, a speaker 32, a liquid crystal device 40, key switches 33, and a microphone 34 accommodated in a package case 36. A control circuit board 37 mounting a control circuit for controlling the operation of each constituting element is provided in the package case 36. The liquid crystal device 1 as shown in FIG. 1 may be used for the liquid crystal device 40.

Input signals through the key switches 33 and the microphone 34, and received data from the antenna 31 is transferred to the control circuit on the control circuit board 37 in this portable phone 30. This control circuit then displays images such as numerals, letters and figures on the display panel of the liquid crystal device 40 based on various input data, and transmits the data out of the antenna 31.

While the present invention has been described with reference to the preferred embodiments, the present invention is not restricted to these embodiments, but various modifications are possible within the scope of the present invention as set forth in the claims.

While the insulation layer 110 is formed with two layers of the first and second insulation layers 112 and 113 in the embodiments shown in FIGS. 20 and 21, the insulation layer 110 may be formed using one of these insulation layers.

The insulation layer was formed on the area except the turn-on inspection area T, the IC packaging area J and the input terminal area N in the fourth embodiment. However, since the IC package area is not provided on the substrate in the liquid crystal device in which the liquid crystal addressing IC is not directly packaged on the substrate, or in the liquid crystal device other than the COG type liquid crystal device, the IC package area is not included in the area not provided with the insulation layer in the latter case.

The present invention was applied to the liquid crystal device in which the liquid crystal addressing IC is packaged only on one of the substrates 11 and 12, or to the liquid crystal device in which the wiring pattern 131 is formed on only one substrate, in FIG. 20. However, the present invention is applicable to the liquid crystals other than those as described above, for example a liquid crystal device in which the liquid crystal addressing IC is packaged on both the substrates 11 and 12. While a passive matrix type liquid crystal device has been assumed in FIG. 20, an active matrix type liquid crystal may be used in place of the passive matrix type liquid crystal device.

While the liquid crystal device according to the present invention was used for the portable phone as an electronic equipment, the liquid crystal device according to the present invention may be used for other arbitrary electronic equipments such as a portable information terminal, an electronic pocketbook and a viewfinder of a video camera.

Figure 25A:
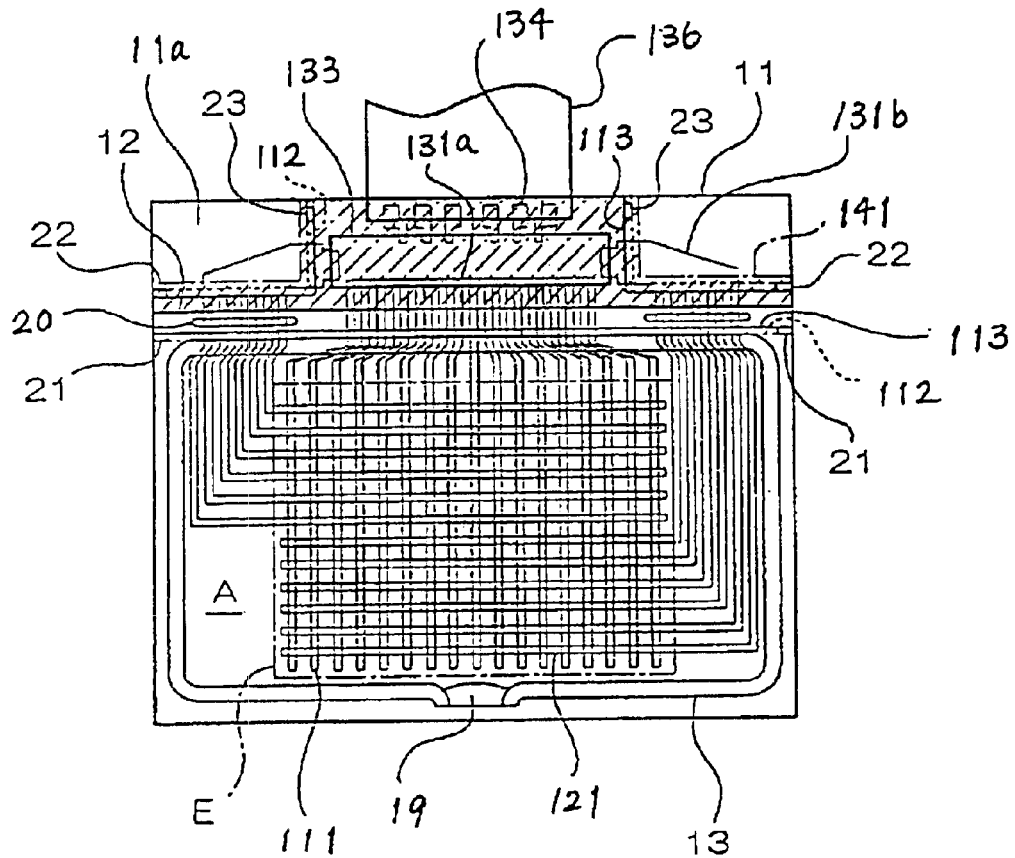
FIG. 25(a) is a schematic perspective plane view illustrating the structure of the liquid crystal device according to the fifth embodiment.
Figure 25B:
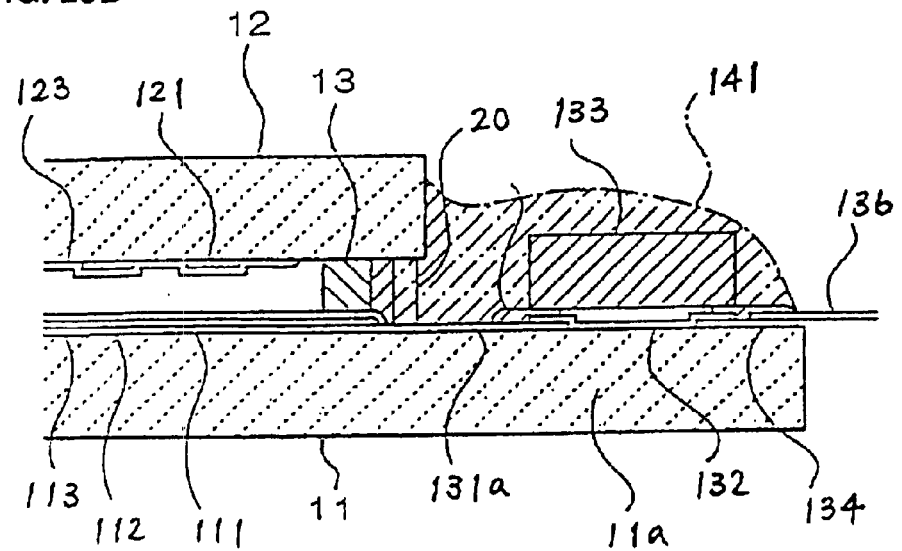
FIG. 25(b) is a schematic cross section illustrating the vicinity of the terrace area according to the fifth embodiment.

The schematic perspective plane view, and the schematic enlarged cross section in the vicinity of the terrace area of the liquid crystal device according to the fifth embodiment of the present invention are shown in FIGS. 25(a) and 25(b), respectively.

While transparent electrodes 111, wiring lines 131a and 131b, and a terminal pattern (input terminals) 134 have been simultaneously formed on a transparent substrate 11 using the same material such as ITO (Indium Tin Oxide) by sputtering, one pair each of positioning marks 21, 22 and 23 are also simultaneously formed on the surface of the substrate using the same material as used in the above members. All the positioning marks 21, 22 and 23 are formed into rectangular shapes in this embodiment.

A protective film (an insulation film) 112, which is called as a top-coat layer or an overcoat layer, is formed in a liquid crystal seal area A over the elements on the surface of the substrate 11 by a lithographic method, sputtering method or oxidation method using an insulation material such as $SiO_2$, $Si_3N_4$ and $TiO_2$. The outer edge at the terrace area 11a side of the protective film 112 is positioned so as to match the outer edge close to the liquid crystal seal area A on the positioning mark 21.

A pair of insulation films 112 are formed on the surface of the terrace area 11a simultaneously with forming the protective film 112 using the same material as the protective film. The outer edges of the insulation films 112 are formed so as to align the outer edge at the side a distance apart from the liquid crystal seal area A at the positioning mark 22, and the outer edge at the side a distance apart from the driver IC 133 package area at the positioning mark 23, respectively.

Figure 26:
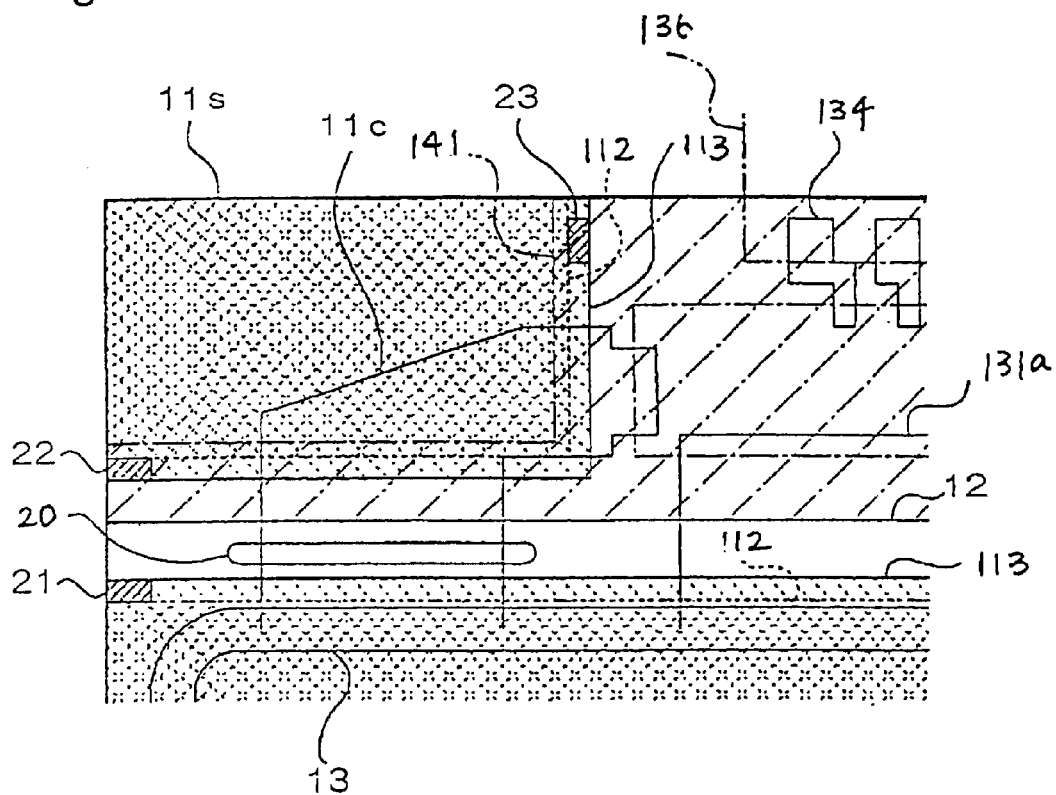
FIG. 26 is a partially enlarged plane view partially showing the plane structure of the terrace area according to the fifth embodiment.

Then, a polyimide resin or a polyalcohol resin is further coated on the protective film 112 and the insulation film 112 to form an orientation film 113 on the liquid crystal seal area A after firing. The outer edge at the terrace area 11a side of the orientation film 113 is formed so as to climb over toward the terrace area 11a side as shown in FIG. 26. The orientation film 113 is positioned so that its outer edge aligns the outer edge at the terrace area 11a side of the positioning mark 21.

The orientation film 113 is also formed on the insulation film 112 which is formed on the terrace area 11a simultaneously with forming the orientation film 113 using the same material. This orientation film 113 is also formed so as to expand out of the outer edge of the insulation film 112 as shown in FIG. 26. In other words, the orientation film 113 is formed so that its outer edge aligns the outer edge at the liquid crystal seal area A side at the positioning mark 22, and aligns the outer edge at the driver IC 133 package area side at the positioning mark 23. The orientation film 113 is subjected to rubbing treatment, and endowed with a required orientation property suitable for the liquid crystal.

Figure 27:
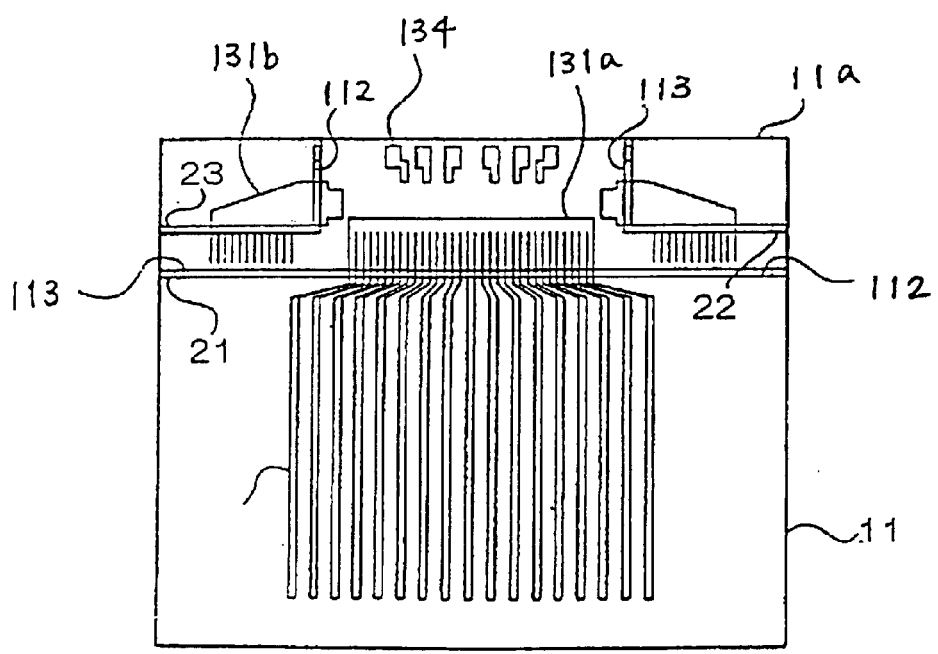
FIG. 27 is a perspective plane view showing a planar pattern on the transparent substrate according to the fifth embodiment.

The planar configuration of the transparent electrodes 111, wiring lines 131a and 131b, terminal pattern 134, protective film 112 and orientation film 113 formed on the transparent substrate 11 as described above are shown in FIG. 27. As shown in FIG. 27, the area mainly comprises the liquid crystal seal area A on which the protective film 112 and orientation film 113 are formed, and the area on the terrace 11a are formed with a distance apart to one another. This is because the area for electrically connecting the wiring lines 131b to the transparent electrode 121 formed on the transparent substrate 12 through a vertical-conductive crossover member 20, and the area for making contact with the prove for electrical inspection, should be secured as will be described hereinafter. The insulation film 112 and the orientation film 113 are formed to be divided to the left and right to one another on the terrace area 11a. This is because the area for packaging the driver IC 133 and the area for connecting the wiring member 136 should be secured as will be described hereinafter.

Then, the seal member 13 and the vertical-conductive crossover member 20 are coated on the transparent substrate 11 to form a plane using a dispenser. The seal member 13 is different from the conventional one, but comprises an insulation resin not containing conductive particles, and may contain insulation spacers. The vertical-conductive crossover member 20 comprises anisotropic conductive material containing conductive particles as in the conventional one. The transparent substrate 12, on which the transparent electrodes 121 and orientation film 123 are formed, is adhered to the transparent substrate 11 as shown in FIG. 25(b), and the bonded substrates are pressurized so that it has a prescribed thickness. The transparent electrodes 121 is conductively connected to the wiring lines 131b via the vertical-conductive crossover member 20 in this embodiment by bonding the two substrates.

The liquid crystal is injected thereafter into the liquid crystal seal area A using a conventional method, and is sealed with a sealing material 19. Subsequently, the driver IC 133 is packaged and the wiring member 134 is connected, and a molding material 141 is coated on the area denoted by oblique lines (dotted oblique lines) shown in FIG. 25(a) for sealing. Since the portions to be provided with the insulation film 112 and the orientation film 113 are not required to be coated with the molding material 141, they remain without being coated with any molding material 141, and maintained to be flat. The outer edge of the molding material 141 is formed so as to extend on the orientation film 113, and so that the orientation film 113 overlaps molding material 141 at their boundary to one another as shown in FIG. 26 in this embodiment.

The driver IC 133 is packaged via an anisotropic conductive film (ACF, not shown) adhered at the edge of the wiring lines 131a and 131b in this embodiment. Accordingly, the portion covered with this anisotropic conductive film is not required to be coated with the resin mod material 141, when the portion not covered with the orientation film 113 is covered with the anisotropic conductive film. The entire wiring area of the terrace area 11a not covered with the orientation film 113 may be covered merely with the anisotropic conductive film. However, since it is usually impossible to cover the wiring lines 131b in the vicinity of the terminal edge with the anisotropic conductive film, the exposed wiring area is protected by using the anisotropic conductive film and the resin molding material 141 together.

The wiring lines 131a and 131b are exposed between the outer edge at the seal member 13 side of the insulation film 112 and the orientation film 113 in the terrace area 11a, and the edge of the transparent substrate 12, in the manufacturing method in this embodiment. Electrical inspection is carried out against the exposed portion at an appropriate timing before coating the resin molding material 141.

Since a flat surface covered with the insulation film 112 and orientation film 113 is formed at a part of the terrace area 11a in this embodiment, the liquid crystal device may be supported using this flat surface while maintaining corrosion resistance of the wiring lines 131a and 131b, making it possible to reduce breakage of the substrate.

Figure 28A:
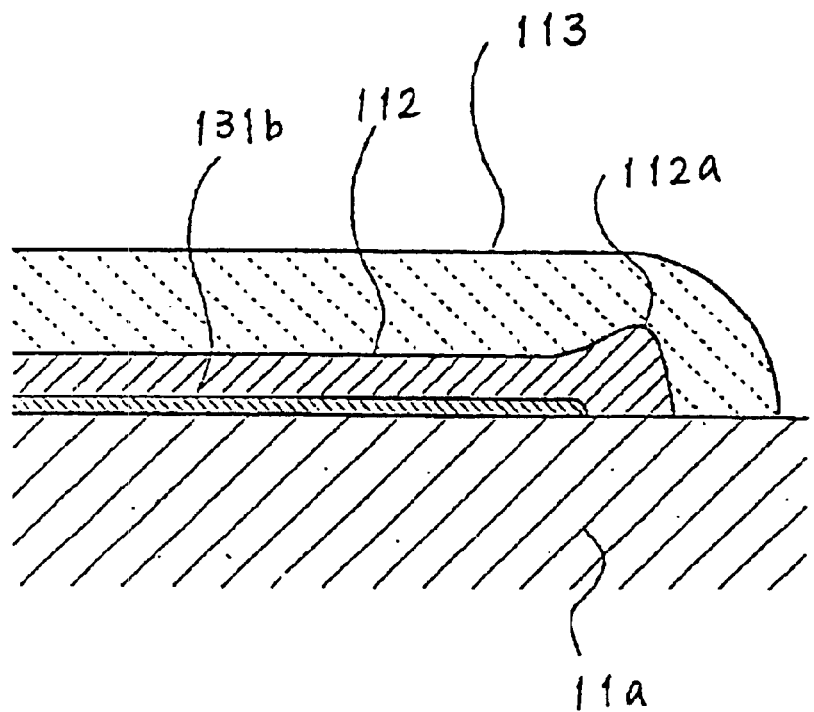
FIG. 28(a) is an enlarged partial cross section showing the cross sectional structure on the terrace area according to the fifth embodiment.
Figure 28B:
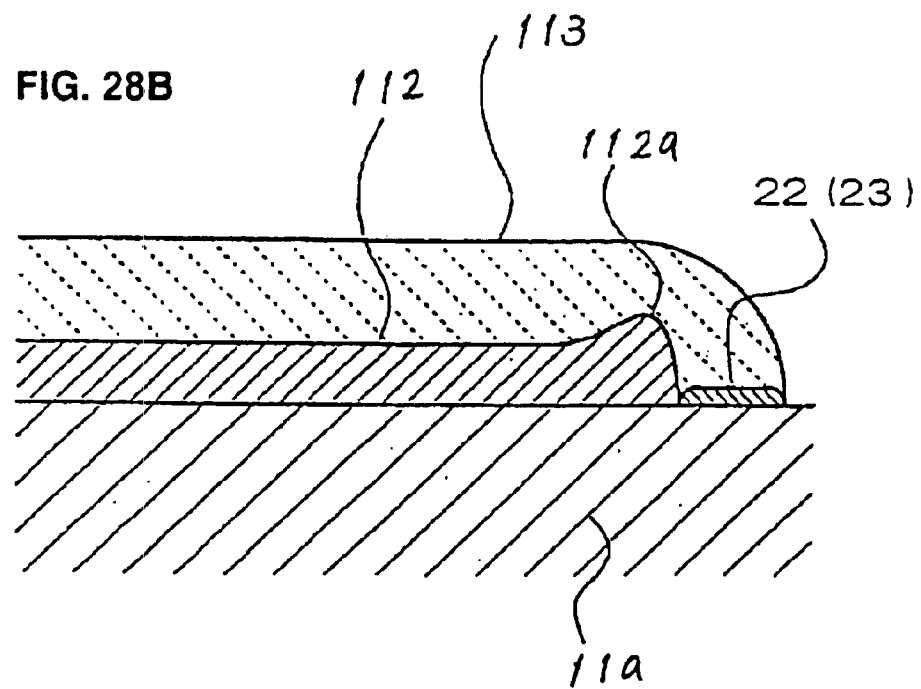
FIG. 28(b) is an enlarged partial cross section showing the cross sectional structure on the terrace area according to the fifth embodiment.

A dense portion 112a is liable to be formed at the outer edge as shown in FIGS. 28(a) and 28(b), when the insulation film 112 and orientation film 113 are formed by the lithographic method. Consequently, the outer edge of the insulation film 112 is rubbed with a part of a rubbing cloth (mostly used by being secured on a roller) making contact with the dense portion 112a during the rubbing treatment, or the orientation film 113 is affected at the portion shaded by the dense portion 112a, when the outer edge of the insulation film 112 is exposed without being covered with the orientation film 113, thereby the image quality may be deteriorated by poor orientation of the orientation film 113. However, since the orientation film 112 covers at least a part of the edge of the insulation film 113 in this embodiment, the dense portion 112a is covered with the orientation film to avoid poor orientation as described above from occurring. The construction of this embodiment as described above is valid when the insulation film 112 is formed by a method other than lithographic printing, because the edge of the insulation film 112 is readily affected by the rubbing treatment when it is exposed.

Since all the edges (the outer edge and inner edge) of the insulation film 112 on the transparent substrate 11 is in particular covered with the orientation film 113 in this embodiment, poor orientation as described above may be more perfectly prevented.

Figure 29A:
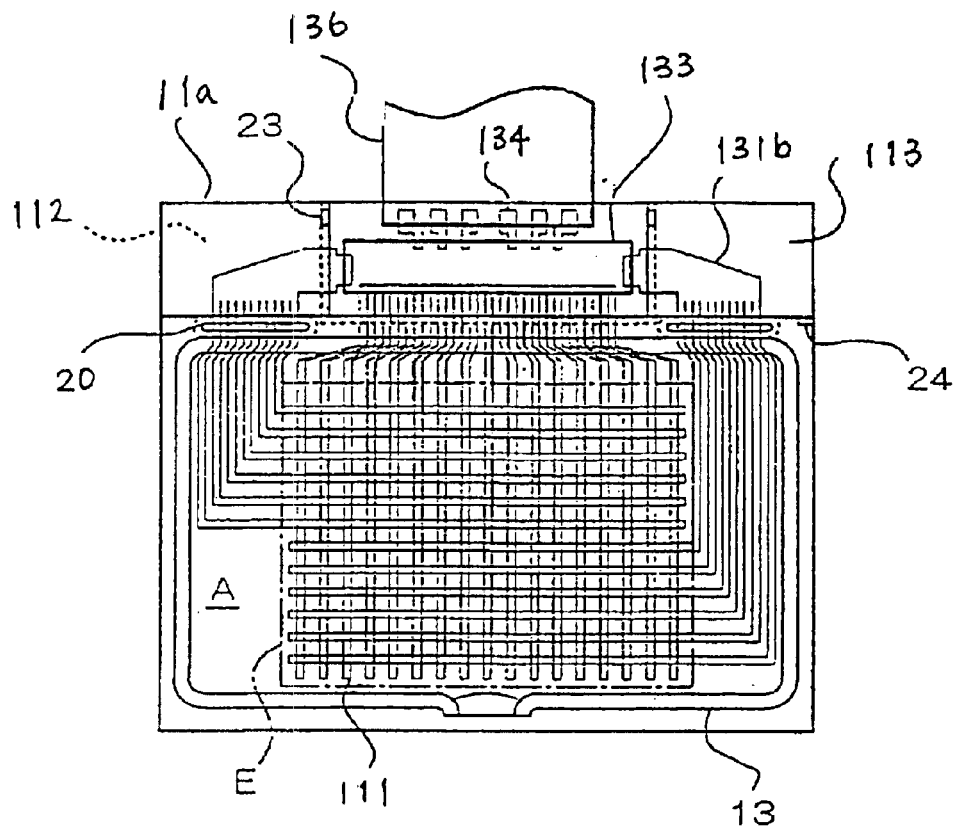
FIG. 29(a) is a schematic perspective plane view illustrating the structure of the liquid crystal device according to the sixth embodiment.
Figure 29B:
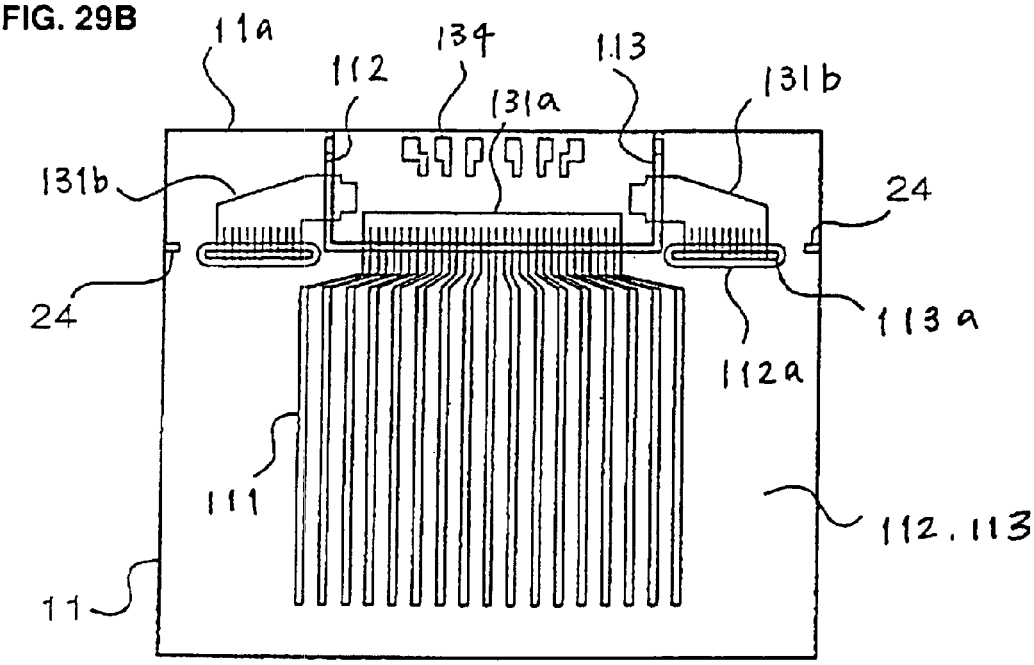
FIG. 29(b) is a schematic perspective plane view illustrating the planar pattern on the transparent substrate according to the sixth embodiment.

The sixth embodiment according to the present invention will be described in detail hereinafter with reference to FIG. 29. Since this embodiment is constructed to be approximately the same as the fifth embodiment, the same or corresponding members are assigned by the same reference numerals, and explanations of the same members are omitted.

The orientation film 113 centered on the liquid crystal seal region A, and the insulation film 112 and the orientation film 113 formed on the terrace area 11a are continuously integrated on the transparent substrate 11 in this embodiment. The packaging area of the driver IC 133 and the connection area of the wiring member 134 are so configured as to expose the wiring lines 131a and 131b, and the terminal pattern 134 in this embodiment as in the foregoing embodiments.

Opening portions 112a and 113a are formed on the insulation film 112 and orientation film 113, respectively, in order to permit the wiring lines 131b to be conductively connected to the transparent electrode 121 via the vertical-conductive crossover member 20 in this embodiment. The opening portion 112a is formed to be a little larger than the opening portion 113a in order to allow the formed to completely envelop the latter. Accordingly, the opening portion of the insulation film 112 is completely covered with the orientation film 113.

The insulation film 112 may be also positioned with the orientation film 113 by taking advantage of the positioning mark 23 in this embodiment, wherein the insulation film and the orientation film are formed so as to circumvent the packaging areas for the IC driver 133 and the wiring member 134. Otherwise, the insulation film 112 may be positioned with the orientation film 113 so that the outer edge of the wiring lines 131a, or the edges of the opening portions 112a and 113a, are aligned with both side edges of the positioning mark 24.

The terrace area 11a may be completely sealed by coating the resin molding material 141 on the packaging area of the driver IC 133 and the wiring member 136, after packaging the driver IC 133 and electrically connecting the wiring member 134. Alternately, only the exposed portions having fine wiring pitches and susceptible to short circuit may be sealed with the resin molding material 141.

Figure 30A:
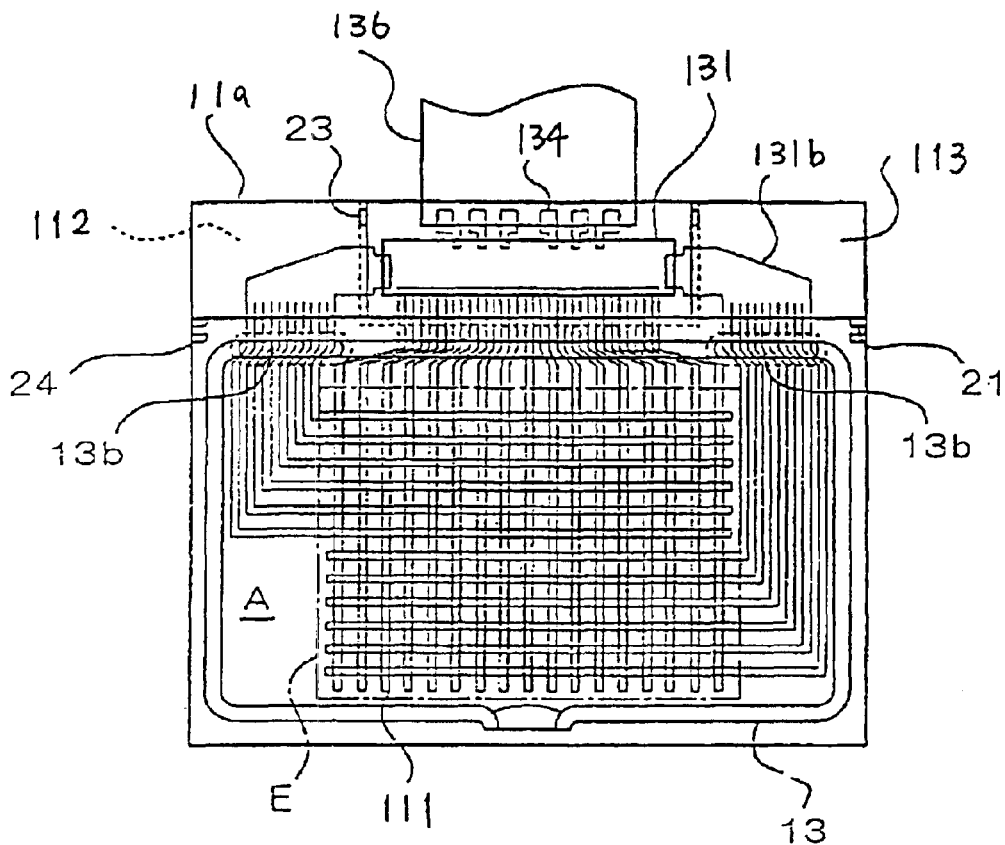
FIG. 30(a) is a schematic perspective plane view illustrating the structure of the liquid crystal device according to the seventh embodiment.
Figure 30B:
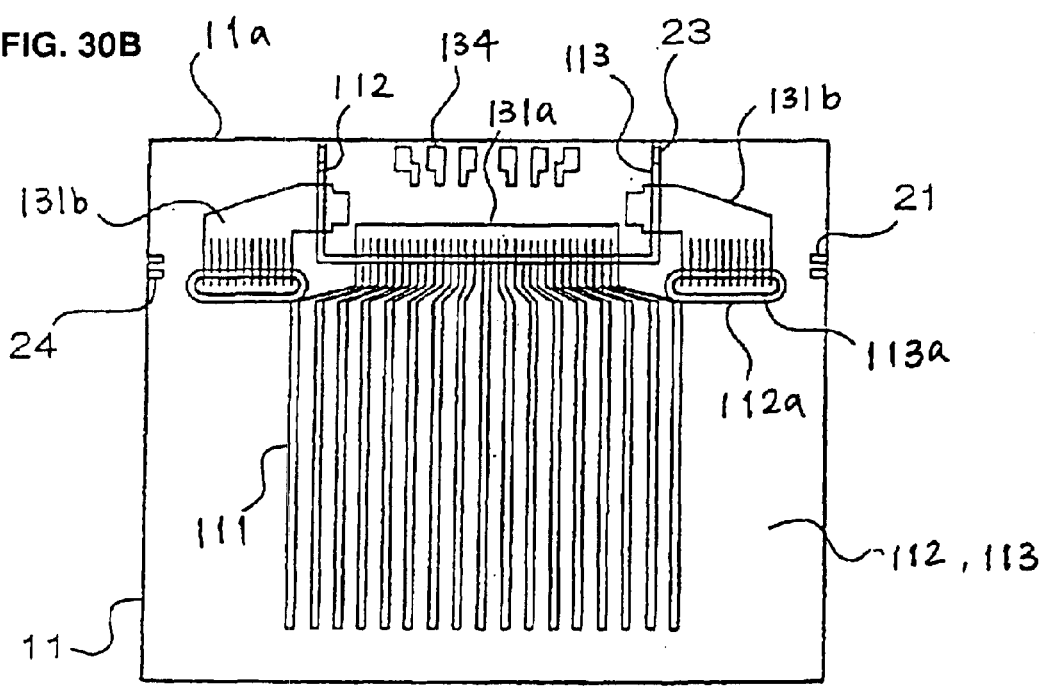
FIG. 30(b) is a schematic perspective plane view illustrating the planar pattern on the transparent substrate according to the seventh embodiment.

The seventh embodiment of the present invention according to the present invention will be described in detail hereinafter with reference to FIG. 30. The same or corresponding members are also assigned by the same reference numerals, and explanations of the same members are omitted in this embodiment.

Figure 31A:
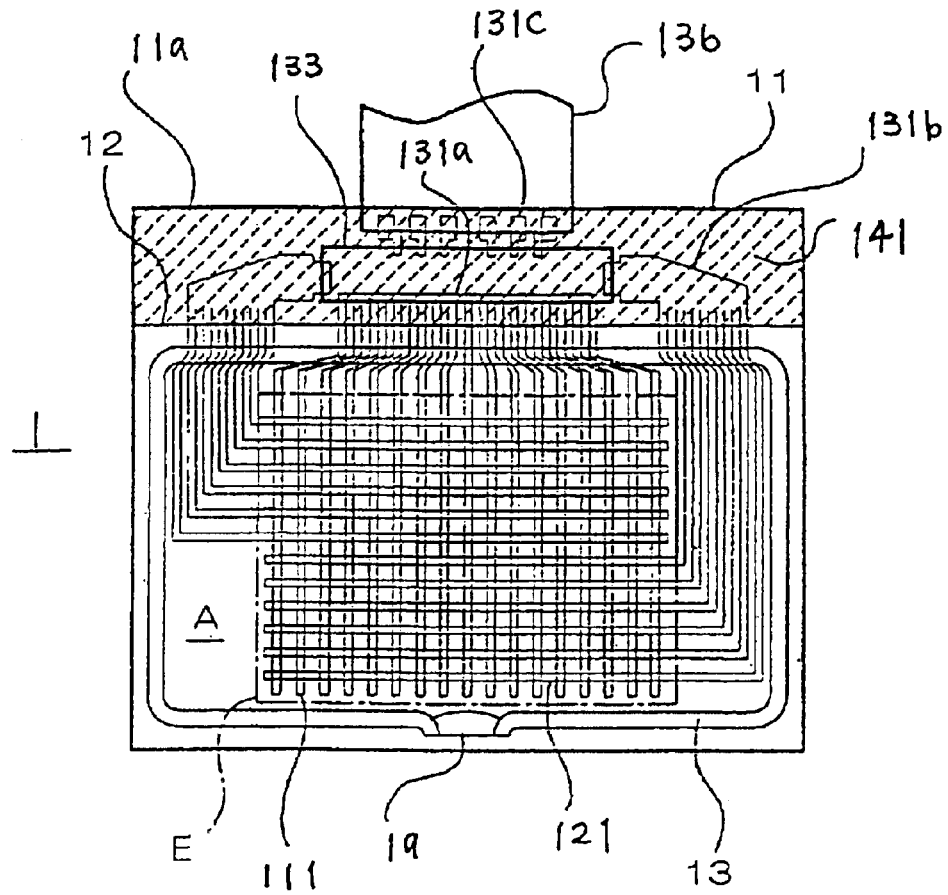
FIG. 31(a) is a schematic perspective plane view illustrating the structure of the conventional liquid crystal device.
Figure 31B:
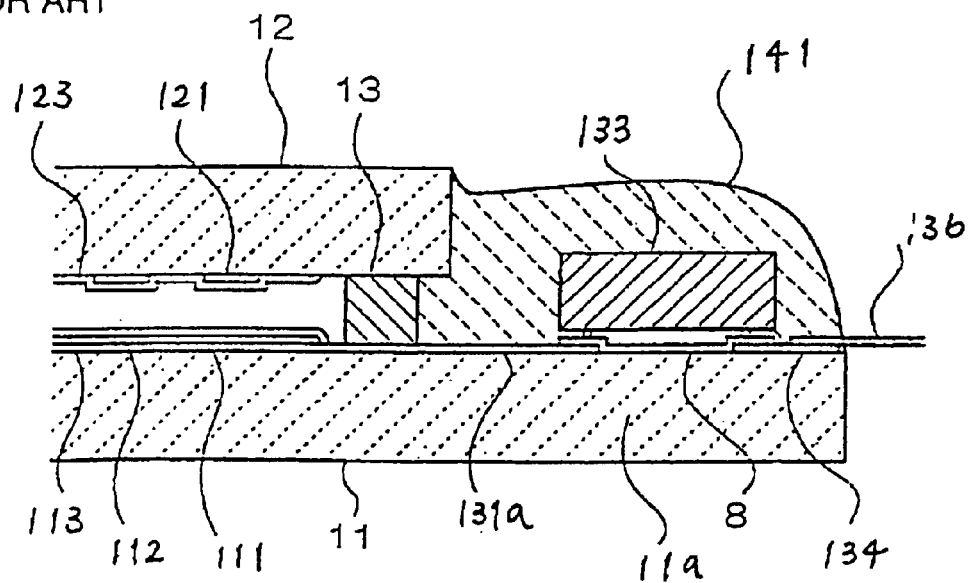
FIG. 31(b) a schematic perspective plane view illustrating the structure in the vicinity of the terrace area of the conventional liquid crystal device.

Conductive particles (for example, metal particles or resin particles on the surface of which an electrical conductive film (a film plated with Ni—Al) is formed) are dispersed in a resin as a seal member 13, and a conductive member, or an anisotropic conductive member, having conductivity only along the direction of thickness of the substrate (along the gap direction between the substrates) is formed by bonding a transparent substrate 11 to transparent substrate 12 via the seal member 13 in this embodiment as in the conventional example shown in FIG. 31. Wiring lines 131b formed on the transparent substrate 11 are put into conductive connection with the transparent electrodes 121 formed on the transparent substrate 12 via a vertical-conductive crossover member 13b.

An insulation layer 112 and an orientation film 113 are also formed in this embodiment as in the sixth embodiment. An opening portion 112a for assuring conductive connection between the electrodes and wiring lines is formed on the insulation film 112, and an opening portion 113a formed to be a little larger so as to completely envelope the opening portion 112a is formed on the orientation film 113. Accordingly, since the edge of the insulation film 112 is completely covered with the orientation film 113, irregular rubbing at the opening portion of the insulation film 112 can be prevented during the rubbing step of the orientation film 113.

The packaging area of the driver IC 133, and the conductive connection area of the wiring member 136 may be also sealed with a resin molding material 141 in this embodiment, after packaging the driver IC 133 and electrically connecting the wiring member 136. Alternately, only the exposed portions having fine wiring pitches and susceptible to electrical shock may be sealed with the resin molding material 141.

The liquid crystal device and the method for manufacturing thereof according to the present invention is not restricted to the embodiments exemplified by the drawings, but various modifications are possible within the range not departing from the spirit of the present invention.

What is claimed is:
1. A liquid crystal device comprising:
   a pair of substrates opposed to one another via a seal member;
   electrodes formed within an inside area of the seal member on one substrate of the pair of substrates; and
   a first insulation film disposed on the electrodes;

wherein in an area outside of the seal member the one substrate includes a protruding area beyond an end portion of the other substrate, and the protruding area includes wiring lines connected to the electrodes; and wherein at least a part of the wiring lines and a part of an area that is free of the wiring lines in the protruding area of the one substrate are coated with a second insulation film made of the same material as the first insulation film.

2. The liquid crystal device according to claim 1, wherein the wiring lines comprise a conductive connection member electrically connected to an integrated circuit or to a wiring member, the conductive connection member is free of the second insulation film.

3. The liquid crystal device according to claim 2, wherein the conductive connection member is connected to the integrated circuit or to the wiring member via an anisotropic conductive film, and wherein an edge of the anisotropic conductive film is formed on the second insulation film.

4. The liquid crystal device according to claim 3, wherein then insulation film is formed along one edge of a first positioning mark, and wherein the anisotropic conductive film is formed along one edge of a second positioning mark.

5. The liquid crystal device according to claim 1, wherein the protruding area includes a packaging area in which wiring lines connected to the electrodes and to an outer circuit including an IC for addressing the liquid crystal device are packaged, and wherein the packaging area is free of the second insulation film.

6. A method for manufacturing a liquid crystal device having a pair of substrates opposed to one another via a seal member, one substrate of the pair of substrates including a protruding area beyond an end portion of the other substrate, the method comprising the steps of:

forming electrodes on the one substrate of the pair of substrates and wiring lines connected to the electrodes on the protruding area; and forming an insulation film covering at least a part of the electrodes and the wiring lines and a part of an area that is free of the wiring lines in the protruding area of the one substrate.

7. The method for manufacturing a liquid crystal device according to claim 6, wherein the wiring lines comprise a conductive connection member electrically connected to an integrated circuit or to a wiring member, the conductive connection member being free from the insulation film.

8. The method for manufacturing a liquid crystal device according to claim 7, wherein the conductive connection member is connected to the integrated circuit or to the wiring member via an anisotropic conductive film, and wherein an edge of the anisotropic conductive film overlaps the insulation film.

9. The method for manufacturing a liquid crystal device according to claim 8, wherein an edge of the insulation film is formed along one edge of a first positioning mark, and wherein the edge of the anisotropic conductive film is formed along one edge of a second positioning mark.

10. The liquid crystal device according to claim 2, wherein terminals connected to the integrated circuit are formed on the protruding area, and the terminals are free of the second insulation film.

11. A liquid crystal device comprising:

a pair of substrates opposed to one another via a seal member;

electrodes formed within an inside area of the seal member on one substrate of the pair of substrates;

an overcoat layer formed on the electrodes; and an orientation film formed on the overcoat layer;

wherein in an area outside of the seal member the one substrate includes a protruding area beyond an end portion of the other substrate that has two corners formed on the one substrate in plan view, the protruding area including wiring lines connected to the electrodes and the wiring lines covered with the overcoat layer and the orientation film formed thereon; and wherein at least a part of the wiring lines and at least one of the corners of the protruding area are coated with a protective film including the overcoat layer and the orientation film; and wherein the entire overcoat layer is covered with the orientation film on the protruding area.

12. A method for manufacturing a liquid crystal device having a pair of substrates opposed to one another via a seal member, one substrate of the pair of substrates including a protruding area beyond an end portion of the other substrate, the method comprising the steps of:

forming electrodes on one substrate of the pair of substrates and wiring lines connected to the electrodes on the protruding area which has two corners formed on the one substrate in plan view;

forming an overcoat layer on the electrodes, the wiring lines, and at least one of the corners of the protruding area;

forming an orientation film on the overcoat layer; and applying a rubbing treatment to the orientation film;

wherein the entire overcoat layer is covered with the orientation film on the protruding area.

13. A liquid crystal device comprising:

a pair of substrates opposed to one another via a seal member;

electrodes formed within an inside area of the seal member on the pair of substrates; and an insulation layer formed on the electrodes of one substrate of the pair of substrates;

wherein in an area outside of the seal member the one substrate includes a protruding area beyond an end portion of the other substrate;

wherein the protruding area includes wiring lines electrically connected to the electrodes provided on the other substrate via a conductive connection member in the seal member, at least a part of the wiring lines being coated with the insulation layer; and wherein the wiring lines immediately beneath the conductive connection member are free of the insulation layer.

14. The liquid crystal device according to claim 13, wherein the insulation layer comprises at least either an overcoat layer covering the electrodes, or an orientation film formed above the electrodes.

15. A liquid crystal device comprising:

a pair of substrates opposed to one another via a seal member;

electrodes formed within an inner area of the seal member on one substrate of the pair of substrates; and an insulation film formed on the electrodes;

wherein in an area outside of the seal member the one substrate includes a protruding area beyond an end portion of the other substrate, the protruding area including a packaging area in which wiring lines connected to the electrodes and to an outer circuit including an IC for addressing the liquid crystal device are packaged, at least a part of the wiring lines are coated with an insulating film made of the same material as the insulation film formed on the electrodes, and a mold member is disposed on the wiring lines formed between the packaging area and the seal member, the entirety of the mold member being disposed between the seal member and the IC.

16. A liquid crystal device comprising:

a pair of substrates opposed to one another via a seal member, and an orientation film provided at an inner face side of one substrate of the pair of substrates, wherein in an area outside of the seal member the one substrate includes a protruding area including wiring lines extending out of an inside area of the seal member, wherein at least a part of the wiring lines is covered with an insulation film, at least an edge of the insulation film being covered with the orientation film, and wherein the protruding area includes a positioning mark, the positioning mark defines both positions of the edge of the insulation film and an edge of the orientation film.

17. The liquid crystal device according to claim 16, wherein in an area inside of the seal member the one substrate includes electrodes for applying an electric field to the liquid crystal, the orientation film being provided on the electrodes, and wherein a protective film is provided between the electrodes and the orientation film, the protective film being made of a same material as the insulation film.

18. The liquid crystal device according to claim 16, wherein the orientation film is formed so as to cover the entire insulation film.

19. The liquid crystal device according to claim 16, wherein the positioning mark includes two outer edges, the insulation film is formed along one outer edge of the positioning mark, and the orientation film is formed along another outer edge of the positioning mark.

20. The liquid crystal device according to claim 19, wherein the one outer edge is opposite the another outer edge.

21. The liquid crystal device according to claim 16, wherein the positioning mark is made of the same material as the wiring lines.

22. A method for manufacturing a liquid crystal device having a pair of substrates opposed to one another via a seal member, one substrate of the pair of substrates including a protruding area beyond an end portion of the other substrate, the method comprising the steps of:

forming electrodes on the one substrate and wiring lines connected to the electrodes on the protruding area;

forming an insulation film covering at least a part of the electrodes and the wiring lines;

forming an orientation film on the insulation film; and forming a positioning mark on the one substrate;

wherein the insulation film is formed along one outer edge of the positioning mark, the orientation film is formed along another outer edge of the positioning mark; and an edge of the insulation film is covered with the orientation film on the protruding area.

* * * * *